(12) United States Patent
Torii

(10) Patent No.: US 9,007,635 B2
(45) Date of Patent: Apr. 14, 2015

(54) IMAGE-FORMING APPARATUS COMMUNICATING WITH AN INFORMATION-PROCESSING APPARATUS

(71) Applicant: Canon Kabushiki Kaisha, Tokyo (JP)

(72) Inventor: Minoru Torii, Machida (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/907,605

(22) Filed: May 31, 2013

(65) Prior Publication Data
US 2013/0335758 A1 Dec. 19, 2013

Related U.S. Application Data

(60) Provisional application No. 61/661,224, filed on Jun. 18, 2012.

(51) Int. Cl.
G06F 3/12 (2006.01)
H04N 1/00 (2006.01)
G06F 17/30 (2006.01)

(52) U.S. Cl.
CPC ............ *G06F 3/1294* (2013.01); *G06F 3/1204* (2013.01); *G06F 3/1272* (2013.01); *G06F 3/1285* (2013.01); *H04N 1/00204* (2013.01); *H04N 1/00244* (2013.01); *G06F 17/3064* (2013.01); *G06F 3/1259* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 6,151,464 A * | 11/2000 | Nakamura et al. | | 399/79 |
| 6,493,702 B1 * | 12/2002 | Adar et al. | | 707/706 |
| 6,681,369 B2 | 1/2004 | Meunier | | |
| 7,590,651 B2 | 9/2009 | Fujio | | |
| 7,830,539 B2 * | 11/2010 | Yajima et al. | | 358/1.15 |
| 7,954,045 B2 | 5/2011 | Yamada | | |
| 8,223,354 B2 * | 7/2012 | Itagaki | | 358/1.14 |
| 8,279,463 B2 * | 10/2012 | Jager et al. | | 358/1.15 |
| 8,379,234 B2 * | 2/2013 | Kuge et al. | | 358/1.13 |
| 8,554,764 B2 * | 10/2013 | Mosoi et al. | | 707/722 |
| 8,587,802 B2 * | 11/2013 | Hosokawa | | 358/1.15 |
| 2006/0028674 A1 * | 2/2006 | Lapstun et al. | | 358/1.15 |
| 2009/0265330 A1 * | 10/2009 | Cheng et al. | | 707/5 |

(Continued)

FOREIGN PATENT DOCUMENTS

| | | |
|---|---|---|
| JP | 2003-248690 A | 9/2003 |
| JP | 2010-020480 A | 1/2010 |
| JP | 2011-198265 A | 10/2011 |

OTHER PUBLICATIONS

Vidhya Govindaraju et al., Similar Document Search and Recommendation, Hewlett-Packard Development Company, 2011.

(Continued)

*Primary Examiner* — Dung Tran
(74) *Attorney, Agent, or Firm* — Canon U.S.A., Inc. IP Division

(57) ABSTRACT

Devices, systems, and methods for generating a document recommendation obtain document setting information, generate a first document recommendation based on the document setting information, send the first document recommendation to an image-forming device, obtain document content information; generate a second document recommendation based on the document content information; and send the second document recommendation to the image-forming device.

19 Claims, 27 Drawing Sheets

(56) References Cited

U.S. PATENT DOCUMENTS

| | | |
|---|---|---|
| 2011/0002014 A1* | 1/2011 | Tani et al. .................. 358/403 |
| 2011/0197166 A1 | 8/2011 | Girgensohn |
| 2012/0060176 A1 | 3/2012 | Chai |

OTHER PUBLICATIONS

Ziyu Guan et al., Document Recommendation in Social Tagging Services, International World Wide Web Conference Committee, 2010.

* cited by examiner

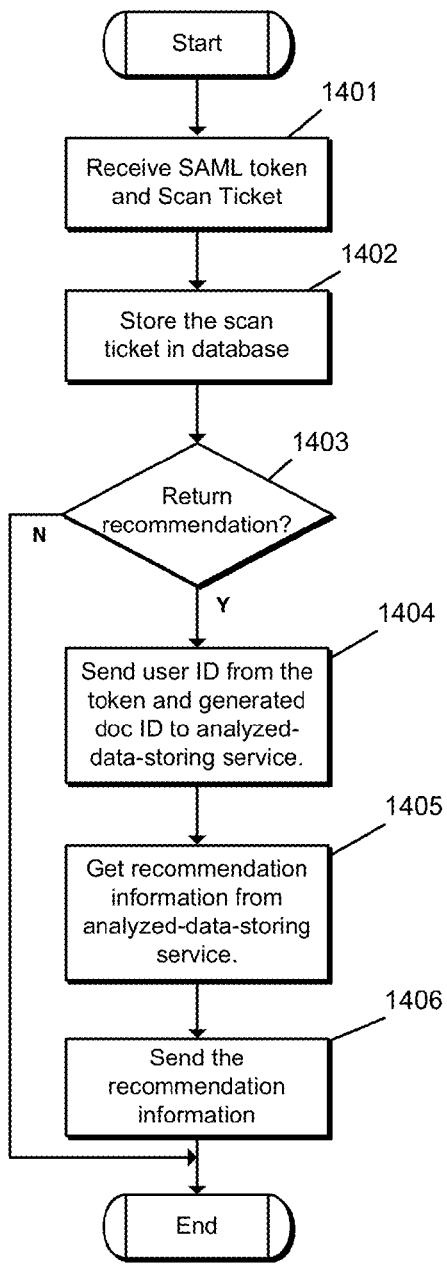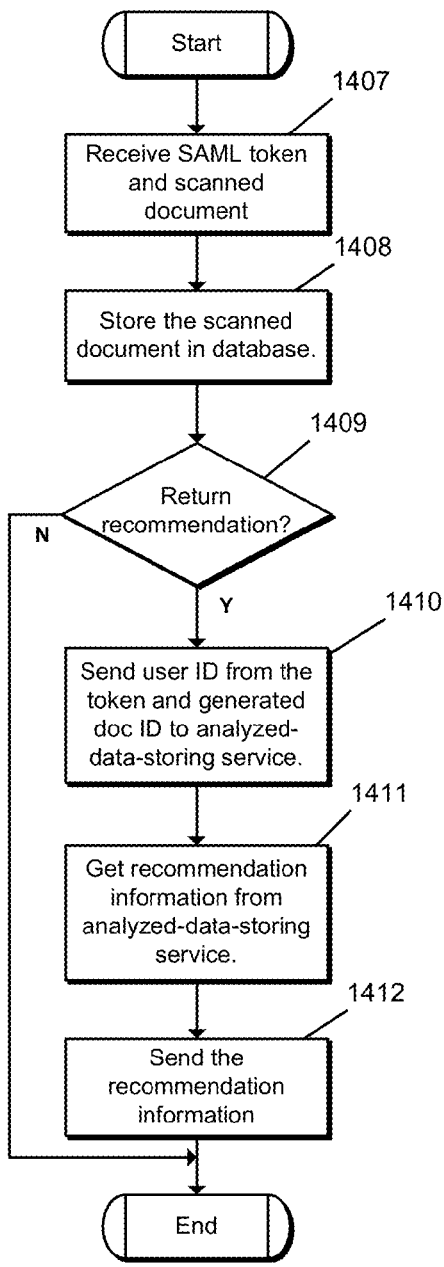
FIG. 14A
FIG. 14B

IMAGE-FORMING APPARATUS COMMUNICATING WITH AN INFORMATION-PROCESSING APPARATUS

CROSS-REFERENCE TO RELATED APPLICATIONS

This application claims priority to U.S. Provisional Application No. 61/661,224, which was filed on Jun. 18, 2012, and which is hereby incorporated by reference in its entirety.

BACKGROUND

1. Field

The present disclosure relates to systems and methods for controlling an image-forming apparatus and an information-processing apparatus that communicates with the image-forming apparatus.

2. Background

More and more image-forming apparatuses are connected to cloud computing services, including document services. There is a technique to display recommended documents stored in a local document service on the display of a PC. And there are document services which provide documents to users. But it is time consuming to get recommendation information in accordance with documents that users are printing or scanning, because sometimes the recommendation information cannot be created until after the completion of the printing or scanning process.

SUMMARY

In one embodiment, a method for generating a document recommendation comprises obtaining document setting information, generating a first document recommendation based on the document setting information, sending the first document recommendation to an image-forming device, obtaining document content information, generating a second document recommendation based on the document content information, and sending the second document recommendation to the image-forming device.

In one embodiment, a device for generating a document recommendation comprises a communication interface; one or more computer-readable media; and one or more processors coupled to the one or more computer-readable media and configured to cause the device to perform operations including obtaining document setting information, sending a first request for a document recommendation to a recommendation service, wherein the request includes the document setting information, receiving a first document recommendation in response to the first request, obtaining at least some contents of a document, sending a second request for a document recommendation to the recommendation service, wherein the request includes the at least some of the contents of the document, and receiving a second document recommendation in response to the second request.

In one embodiment, one or more computer-readable media store instructions that, when executed by one or more computing devices, cause the computing devices to perform operations comprising obtaining user information, generating a first document recommendation based on the user information, sending the first document recommendation to a requesting device, obtaining document setting information, generating a second document recommendation based on the document setting information, sending the second document recommendation to the requesting device, obtaining a page of document data, generating a third document recommendation based on the page of document data, and sending the third document recommendation to the requesting device.

BRIEF DESCRIPTION OF THE DRAWINGS

FIG. 14A is a flow chart that illustrates an example embodiment of operations performed by a document-store service for a scan process.

FIG. 14B is a flow chart that illustrates an example embodiment of operations performed by a document-store service when it receives a scanned document.

DESCRIPTION

The following disclosure describes certain explanatory embodiments. Other embodiments may include alternatives, equivalents, and modifications. Additionally, the explanatory embodiments may include several novel features, and a particular feature may not be essential to some embodiments of the devices, systems, and methods described herein.

Figure 1:
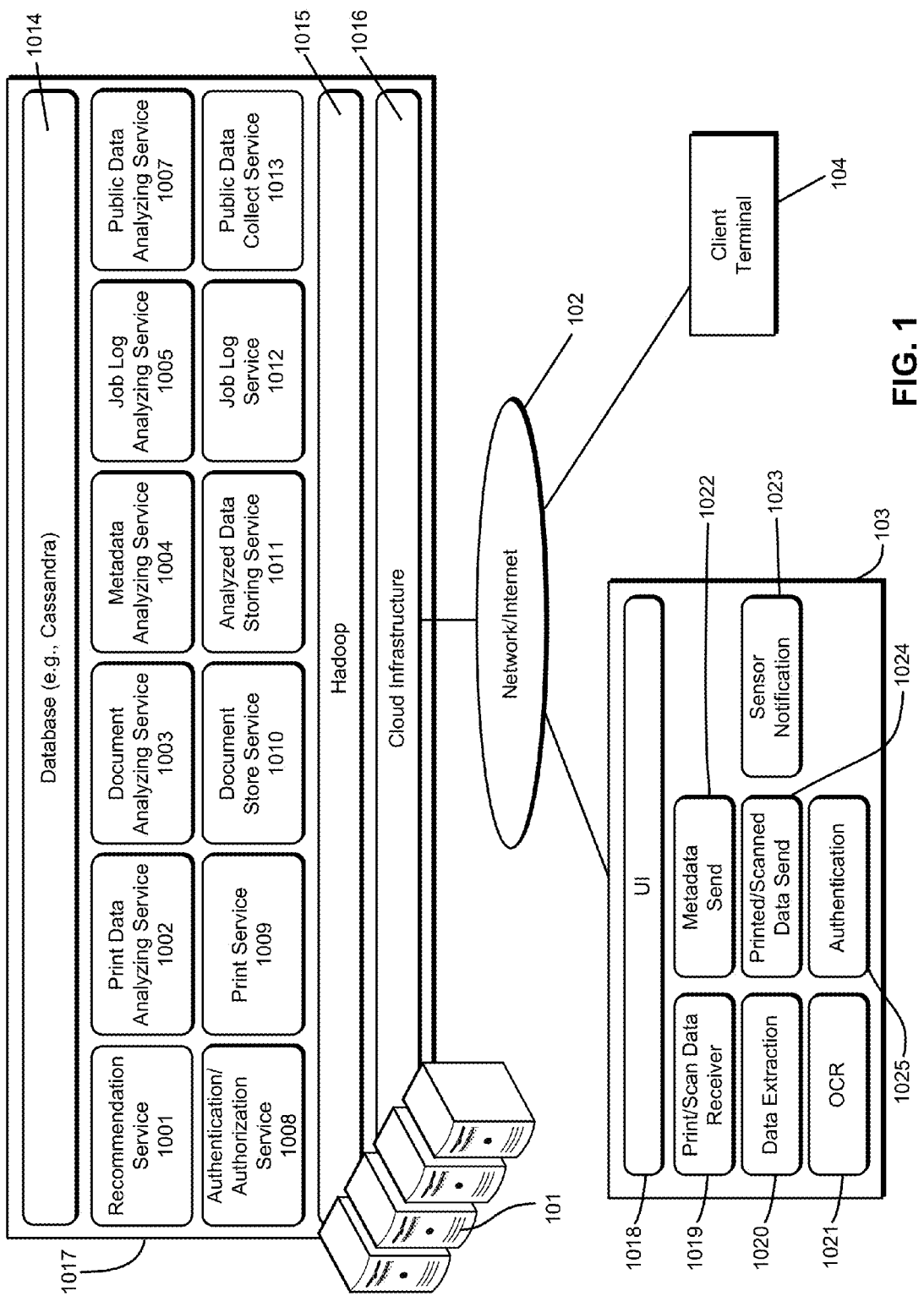
FIG. 1 is a block diagram that illustrates an example embodiment of a network-connected system.

FIG. 1 is a block diagram that illustrates an example embodiment of a network-connected system. One or more server(s) 101 may be connected to the network 102. One or more multi-function devices 103 (a multi-function device is also referred to herein as an "MFD"), scanning devices, or image-forming devices may each include a motion sensor to detect a person's approach to the physical device. When the motion sensor detects a person, the MFD 103 recommends related documents, news, blogs, other printed documents, scanned documents, or copied documents. The recommended documents are displayed in an operation panel, for example the operation panel 407 (e.g., a front panel) shown in FIG. 4. In addition, the recommended documents may be also presented by a voice broadcast by speakers on the MFD 103. The operation panel 407 of the MFD 103 may provide a user experience similar to a tablet computer or similar devices. The MFD 103 also includes a user interface module ("UI module") 1018, which generates user interfaces for display on the operation panel 407.

During printing, a printer driver may present a recommendation dialog (e.g., a pop-up) on a user interface. In addition, the voice message may be broadcast by the speakers. When the user grabs printed paper, the front panel of the MFD 103 is turned on and displays the recommended documents. When the user scans or copies documents, the MFD 103 displays recommended documents or the voice message is played by the MFD 103. Hadoop 1015 and cloud infrastructure 1016 may be implemented in the servers 101. Hadoop 1015 is a Java-based framework that supports the processing of large data sets in a distributed-computing environment performed by multiple computers.

The MFD 103 can perform copying, scanning, a printing process, and facsimile communication in accordance with a user's instruction or an instruction received via the network/Internet 102 (also referred to herein at "network 102"). The client terminal 104 may hold data, including document data or print data. The client terminal 104 may send the data to the MFD 103 to print the data on paper sheets or another medium. The MFD 103 may communicate with a cloud service 1017 via the network 102. The network 102 may include a local area network or the Internet. The cloud service 1017 may include services described below.

A print/scan-data-receiver component 1019 receives printing data or scanning data. The received data is passed to a data-extraction component 1020. The data-extraction component 1020 extracts document setting information, which may include one or more document tickets (e.g., print tickets, scan tickets) or a DevMode structure, from the received data. Using document tickets as an explanatory example, the data-extraction component 1020 parses these tickets and extracts metadata. The extracted metadata is passed to a metadata-send component 1022. The metadata-send component 1022 sends metadata to a metadata-analyzing service 1004 on the cloud service 1017.

The data-extraction component 1020 also extracts the print data and the scan data itself. The extracted print data is passed to the printed/scanned-data-send component 1024. The extracted scanned data is passed to an OCR component 1021. The OCR component 1021 processes the scanned data. The OCR'ed and scanned data is passed to the printed/scanned-data-send component 1024.

The printed/scanned-data-send component 1024 sends print data to a print-data-analyzing service 1002 of the cloud service 1017 via the network 102. The printed/scanned-data-send component 1024 also sends the OCR'ed and scanned data to a document-store service 1010 of the cloud service 1017.

An authentication component 1025 of the MFD 103 performs login or authentication processes before accessing services provided by the cloud service 1017. A sensor-notification component 1023 detects events from a motion sensor 408 in FIG. 4 when someone is approaching the MFD 103. A recommendation service 1001 retrieves recommendation information from an analyzed-data-storing service 1011 of the cloud service 1017.

Figure 2:
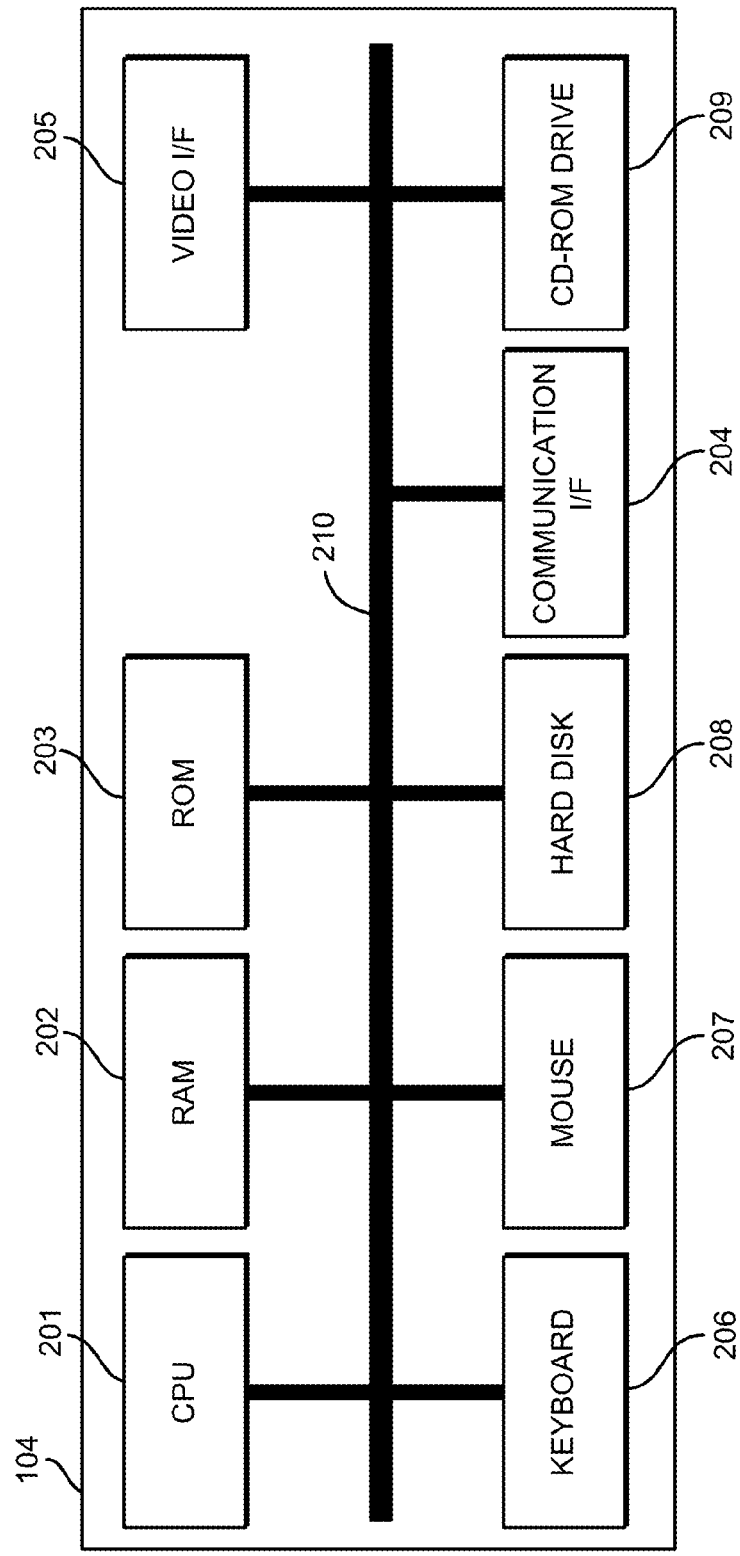
FIG. 2 is a block diagram that illustrates an example embodiment of a hardware configuration of a client terminal.

FIG. 2 is a block diagram that illustrates an example embodiment of a hardware configuration of a client terminal (e.g., the client terminal 104 depicted in FIG. 1). The client terminal 104 may include a CPU 201, a RAM 202, a ROM 203, a communication interface 204, a video interface 205, a hard disk drive 208 (also referred to herein as "HDD"), a CD-ROM drive 209, and a keyboard 206 and mouse 207 (which serve as input units). These components of the client terminal 104 are connected to each other via a system bus 210. The system bus 210 includes, for example, a PCI bus, AGP bus, or memory bus.

Note that it is inherent that the system depicted in FIG. 2 may have a connection chip between buses, a keyboard interface, and an input/output interface, such as a so-called SCSI or ATAPI interface.

The CPU 201 performs various calculations and algorithms, such as for arithmetic operations and comparison operations, and performs hardware control based on an operating system (OS) program, application programs, and printer drivers stored in the ROM 203 or storage, for example the HDD 208 (which may be internal or external).

The ROM 203 and the HDD 208 store an operating system, Web browser program, and the like. The communication interface 204 communicates with external devices connected via a network in cooperation with a communication program of the operating system controlled or implemented by the CPU 201. The RAM 202 stores data downloaded via the communication interface 204. The video interface 205 generates an image signal to be output to a display device. The keyboard 206 and mouse 207 are used to input an instruction to the client terminal 104.

Figure 3:
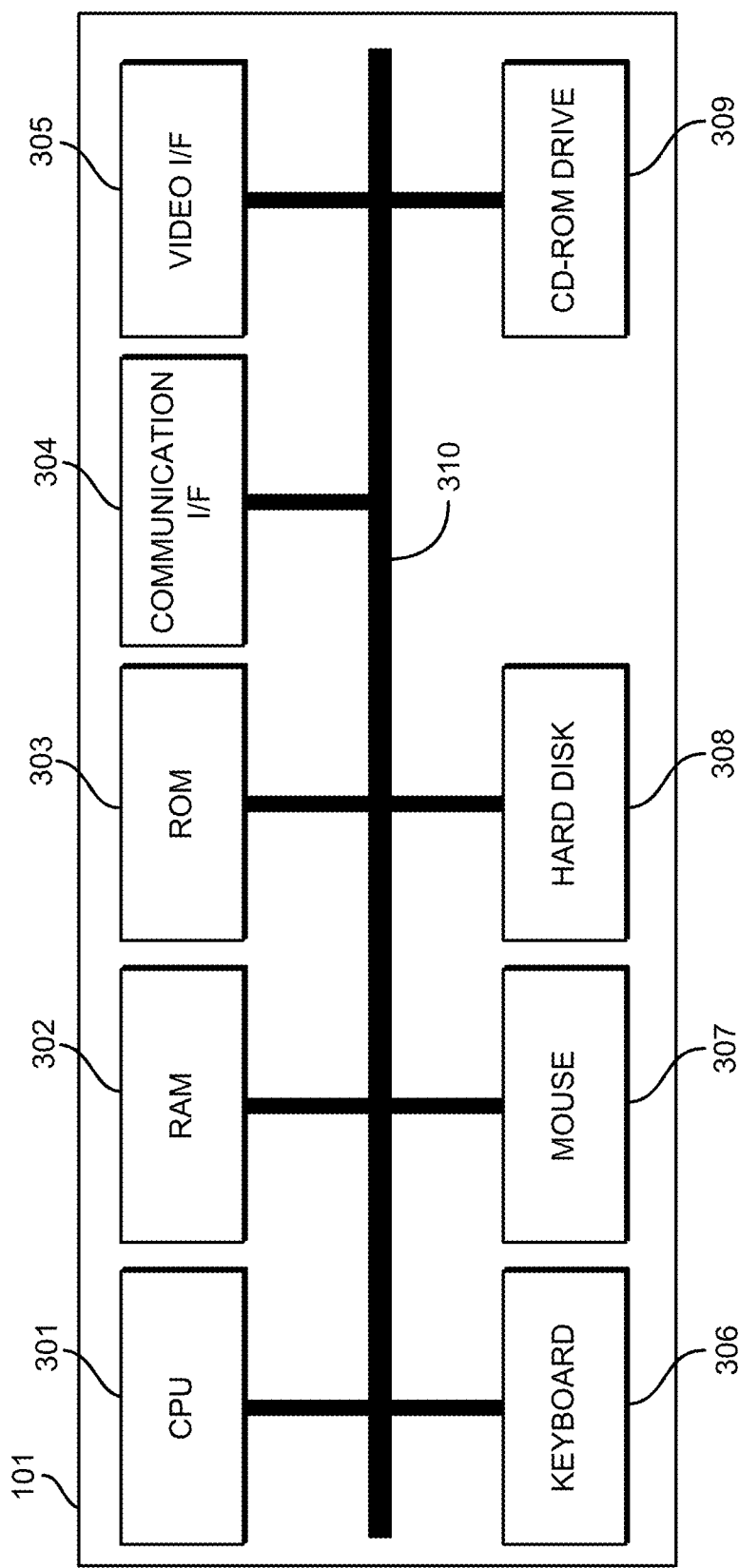
FIG. 3 is a block diagram that illustrates an example embodiment of a hardware configuration of a server terminal.

FIG. 3 is a block diagram that illustrates an example embodiment of a hardware configuration of a server terminal (e.g., one of the servers 101). Software functions of blocks 1001 through 1016 in FIG. 1 may be stored in the HDD 308, loaded to the RAM 302, and be performed by the CPU 301. As shown FIG. 1, the server 101 may be realized by one or plural computer terminals.

The embodiment of a server terminal 101 includes at least one CPU (s) 301, a RAM 302, a ROM 303, a communication interface 304, a video interface 305, a keyboard 306, a mouse 307, a HDD 308, and a CD-ROM drive 309. These components of the server 101 are connected to each other via a system bus 310. The system bus 310 includes, for example, a PCI bus, an AGP bus, or memory bus.

Note that it is inherent that the system depicted in FIG. 3 may have a connection chips between buses, a keyboard interface, and an input/output interface, such as a so-called SCSI or ATAPI interface.

The CPU 301 performs various calculations, such as for arithmetic operations and comparison operations, and hardware control based on an operating system (OS) program and application programs. The RAM 302 stores an operating system program, application programs, and the like read from the HDD 308 or a storage medium, such as a CD-ROM or CD-R, loaded in the CD-ROM drive 309. The CPU 301 executes these programs to realize services 1001-1013 in FIG. 1. The database 1014 is stored in the HDD 308.

The ROM 303 stores a BIOS and the like which control input or output of data to or from the HDD 308 in cooperation with the operating system. The communication interface 304 communicates with external devices that are connected via a network in cooperation with a communication program of the operating system that is controlled or implemented by the CPU 301. The video interface 305 generates an image signal to be output to a display device. The keyboard 306 and mouse 307 are used to input an instruction to the server terminal 101. The HDD 308 stores an OS and application programs (e.g., a print system program).

The CD-ROM drive 309 is used to read an optical storage medium, such as a CD-ROM, CD-R, or CD-R/W, and install an application program to the HDD 308. Instead of the basic CD-ROM drive, a drive for another type of storage medium may be included, including a CD-R drive, CD-R/W drive, or DVD drive.

Figure 4:
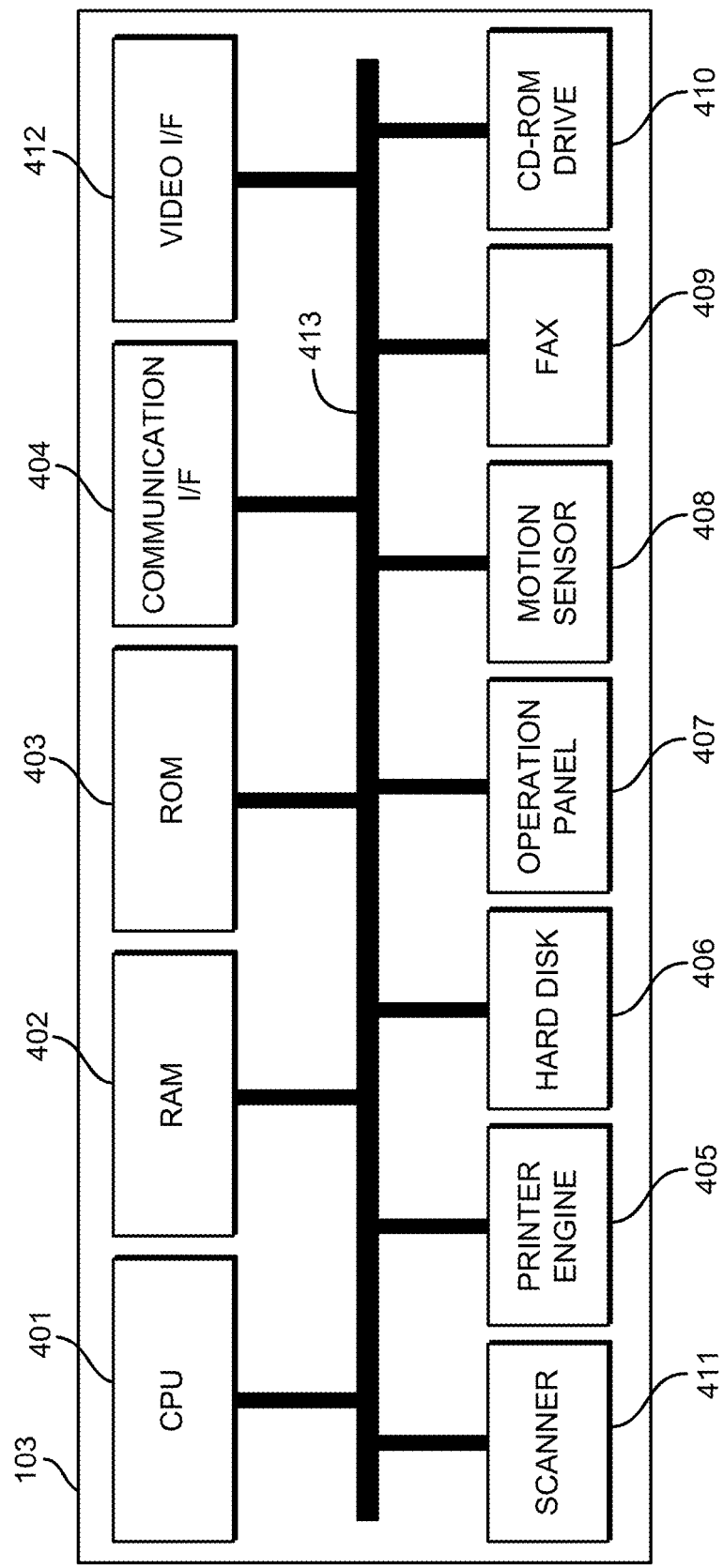
FIG. 4 is a block diagram that illustrates an example embodiment of a hardware configuration of an MFD.

FIG. 4 is block diagram that illustrates an example embodiment of a hardware configuration of an MFD (e.g., the MFD 103). The MFD 103 includes at least one CPU 401, a RAM 402, a ROM 403, a communication interface 404, a video interface 412, a printer engine 405, a HDD 406, an operation panel 407, a motion sensor 408, a scanner 411, a fax component 409, and a CD-ROM drive 410. The components of the MFD 103 are connected to each other via a system bus 413.

Using the RAM 402 as a working memory, the CPU 401 executes software stored in the HDD 406. The software stored in the HDD 406 may be performed by the CPU 401 to realize the operations of the modules 1018-1025 (shown in FIG. 1). Also, the modules 1018-1025 may be realized by customized hardware circuits. The CPU 401 sets the operation of the MFD 103 in accordance with a user instruction input from the operation panel 407. The CPU 401 generates image data based on print data, such as PDL data, input from an external device via the communication interface 404. The CPU 401 may process image data in accordance with input from a scanner 411, which feeds and scans sheets. And the CPU 401 supplies the image data to the printer engine 405, which manages printing of the image data. The ROM 403 stores a BIOS and the like which control the input or output of data to or from the HDD 406. The CPU 401 also controls a copy process in accordance with the user's input, which may be received via the operation panel 407. The CPU 401 also controls a fax component 409.

Figure 5:
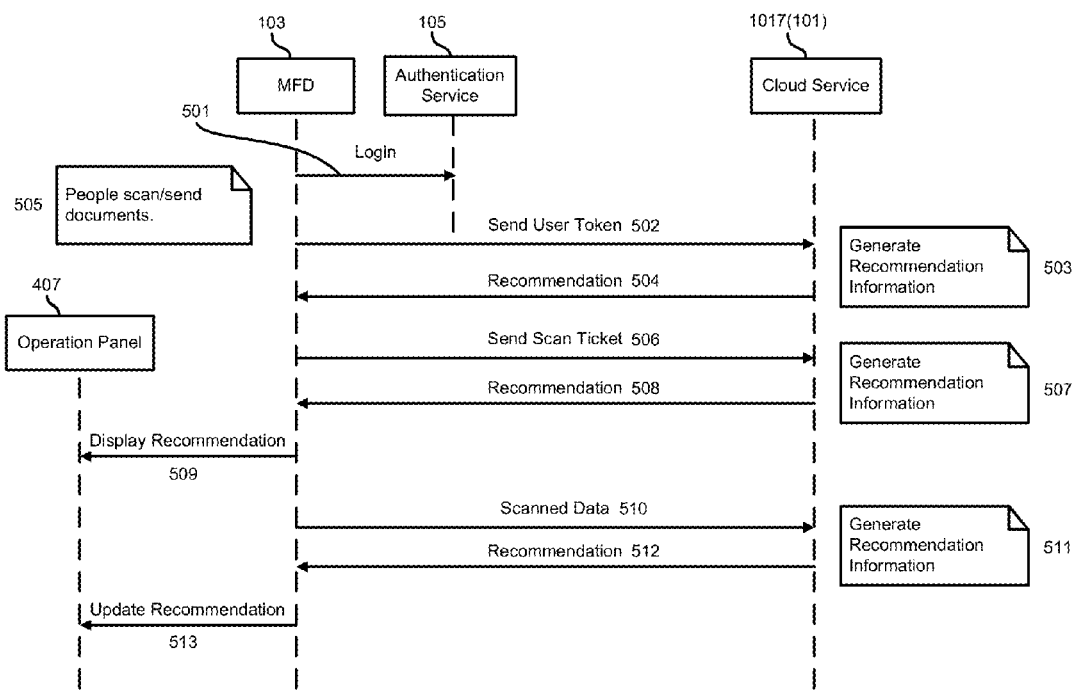
FIG. 5 illustrates an example embodiment of a timing chart for a scan process.

FIG. 5 illustrates an example embodiment of a timing chart for a scan process. At a login operation 501, a user inputs user authentication information, such as a user ID and password or other credential information. Although this embodiment describes user authentication information, some embodiment use other user information, for example attributes of a user. Attributes may include, for example, name, job title, age, location, department, security clearance, phone number, and interests. An MFD 103 sends the authentication information to an authentication service 105. The authentication service 105 issues a user token and sends it to the MFD 103 (operation not shown). Then the MFD 103 sends the user token to the cloud service 1017 in operation 502. In operation 503, the cloud service 1017, which is implemented by one or more servers 101, communicates with backend services to generate recommendation information in accordance with the user token sent in operation 502. In operation 504, the cloud service 1017 sends the recommendation information to the MFD 103. The MFD 103 stores the recommendation information in a cache.

The recommendation information can be displayed before operation 505. In operation 505, the MFD 103 starts scanning sheets of paper documents and generates image data or PDF data. Next, the MFD 103 obtains a scan ticket and sends it to the cloud service 1017 in operation 506. The cloud service 1017 generates recommendation information in accordance with the scan ticket in operation 507, and then the cloud service 1017 sends the recommendation information to the MFD 103 in operation 508.

The MFD 103 updates a cache of the recommendation information, and, in operation 509, the MFD 103 updates the display of the operation panel 407 in accordance with the recommendation information sent in operation 508. When the scan is complete, complete scanned data is sent from the MFD 103 to the cloud service 1017 in operation 510. The cloud service 1017 OCRs the scanned data and generates recommendation information in accordance with the scanned data in operation 511. And the cloud service 1017 sends the recommendation information to the MFD 103 in operation 512. The MFD updates the display of the operation panel 407 in operation 513.

Figure 6:
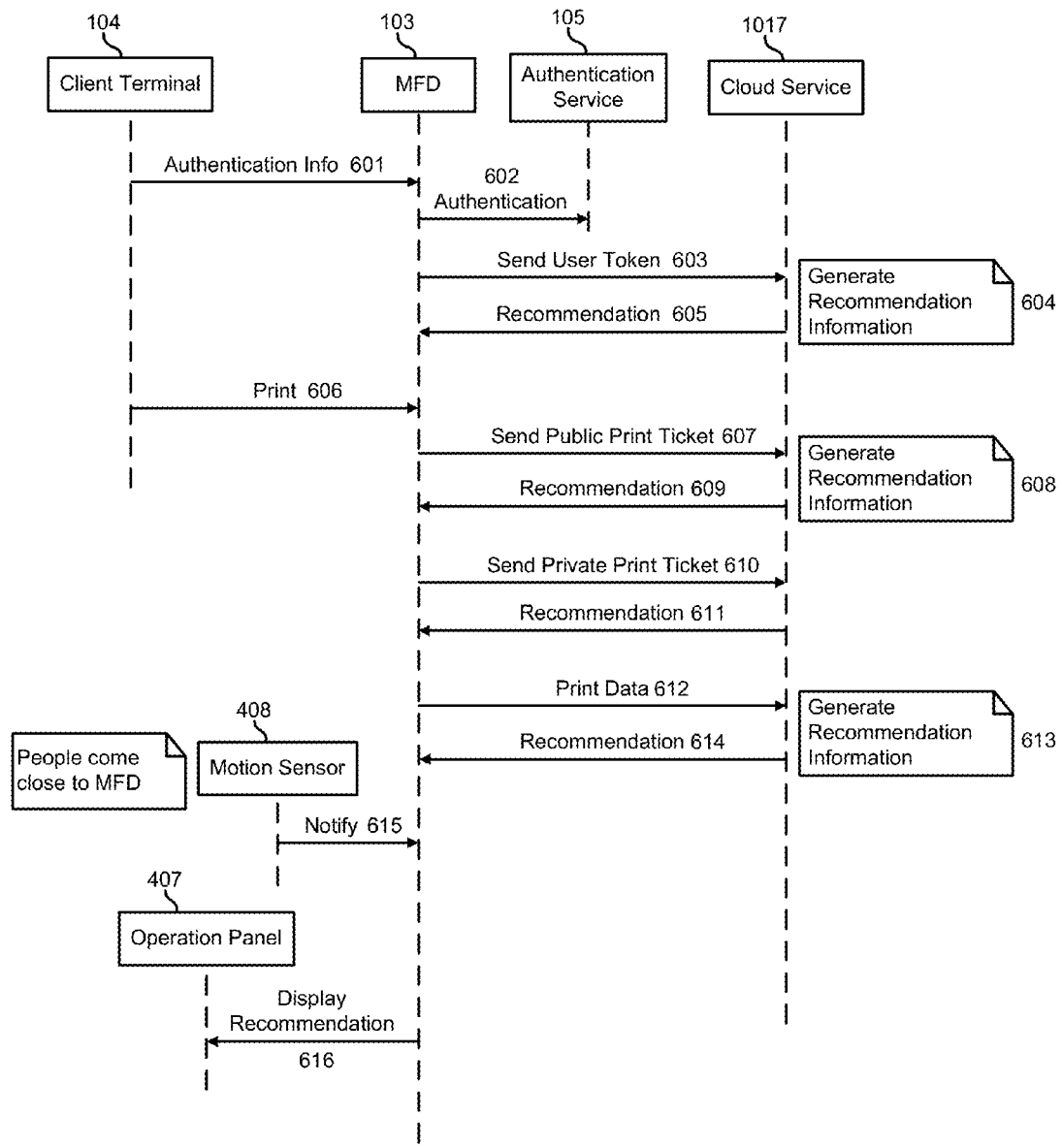
FIG. 6 illustrates an example embodiment of a timing chart for a print process.

FIG. 6 illustrates an example embodiment of a timing chart for a print process. A client terminal 104 sends user authentication information (e.g., a user ID or credential information, such as a password) to the MFD 103 in operation 601. The MFD 103 passes the authentication information to an authentication service 105 in operation 602. In some embodiments, a printer driver in the client terminal 104 sends the user authentication information to the MFD 103, the authentication service 105, or another identity provider. Also, in operation 602 the MFD 103 may get a user token from the authentication service 105 in response to the verification of the user authentication information. The user token may include claims of the user and a user ID corresponding to the user. The claims may include a property of the user, such as a telephone number, an e-mail address, and the name of an organization that the user belongs to.

Next, the MFD 103 sends the user token to a cloud service 1017 in operation 603. After the cloud service 1017 confirms the user token, the cloud service 1017 generates or acquires the recommendation information corresponding to the user token in operation 604. The MFD 103 gets the recommendation information corresponding to the user token from the cloud service 1017 (e.g., an analyzed data storing service 1008 of the cloud service 1017) in operation 605. The MFD 103 stores the recommendation information with the user token in a cache. When the MFD 103 receives the printing data from the client terminal 104 in operation 606, the MFD 103 sends a public print ticket to the cloud service 1017 (e.g., the analyzed data storing service 1008) in operation 607. The cloud service 1017 generates the recommendation information based on the print ticket in operation 608, and the MFD 103 gets the recommendation information from the cloud service 1017 in operation 609. The public print ticket may include print settings such as duplex, copies, letter, landscape, document name, author, and other settings.

Next, the MFD 103 updates the cached data in accordance with the received recommendation information. The MFD 103 then sends a private print ticket to the cloud service 1017 in operation 610. The MFD 103 gets the recommendation information based on the private print ticket from the cloud service 1017 in operation 611. The private print ticket may include vendor-specific print settings, such as auto color, confidential, booklet gutter, or booklet auto correction. Cached data stored in the MFD 103 is updated again in accordance with the recommendation information received in operation 611.

Finally, the MFD 103 sends the print data to the cloud service 1017 (e.g., the analyzed data storing service 1008) in operation 612. The cloud service 1017 (e.g., the analyzed data storing service 1008) analyzes the print data to extract key words and features of images and generates recommendation information based on the print data in operation 613. Next, the cloud service 1017 returns the recommendation information, which may include related documents or news, to the MFD 103 in operation 614. The cached data, including the previous recommendation information sent to the MFD 103, is updated in accordance with the new recommendation information sent in operation 614. The motion sensor 408 detects someone approaching the physical device and notified the MFD 103 in operation 615, and the operation panel 407 of the device displays the received recommendation information in operation 616.

In this way, when the user approaches the MFD 103 before printing has completed, interim recommendation information in the cache is displayed on the operation panel 407 of the MFD 103, and the operation panel 407 is updated as more recommendation information is received.

Figure 7:
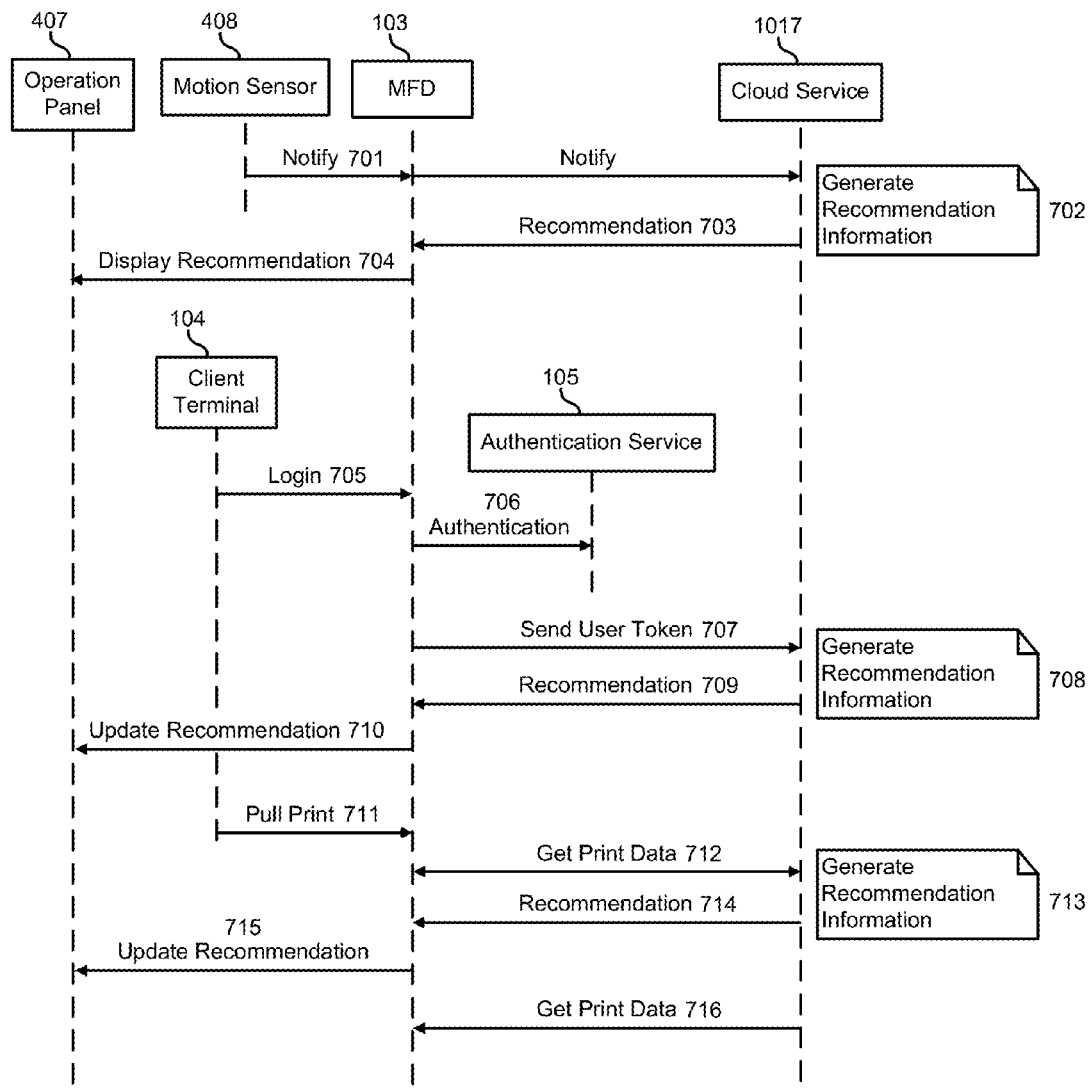
FIG. 7 illustrates an example embodiment of a timing chart for a pull-print process.

FIG. 7 illustrates an example embodiment of a timing chart for a pull-print process. Pull print means that, for example, an MFD 103 retrieves print data from a server 101, which holds the print data, and then prints the print data. Once the motion sensor 408 detects a person approaching the MFD 103, the motion sensor 408 notifies the MFD 103 of the event in operation 701. The notification is also passed to a cloud service 1017 in operation 701. The cloud service 1017 generates recommendation information in operation 702, and the MFD 103 obtains the recommendation information from the cloud service 1017 in operation 703. Then, in operation 704, the MFD 103 controls display of the obtained recommendation information in the operation panel 407. A client terminal 104 sends user authentication information to the MFD 103 in operation 705. The MFD 103 passes the authentication information (e.g., a User ID and credential information including, a password) to an authentication service 105 in operation 706. The MFD 103 gets a user token from the authentication service 105, and the MFD 103 sends the user token, in operation 707, to the cloud service 1017. The user token may include claims of the user and a user ID corresponding to the user. The claims may include properties of the user, such as a telephone number, an e-mail address, and name of an organization that the user belongs to.

The cloud service 1017 generates recommendation information in accordance with the user token in operation 708. Then the cloud service 1017 sends the recommendation information to the MFD 103 in operation 709. The MFD 103 controls the update of the display of the operation panel 407 in operation 710, in accordance with the recommendation information received in operation 709. The client terminal 104 sends a request for a pull print to the MFD 103 in operation 711. In operation 712, the MFD 103 sends location information and identification information in accordance with the request, and the cloud service 1017 obtains print data in accordance with the location information and the identification information and sends the print data to the MFD 103. Also, the cloud service 1017 generates recommendation information in operation 713 and sends the recommendation information to the MFD 103 in operation 714. The print data and the recommendation information may be sent in parallel. If there are many print data, the sending process for sending the recommendation information from the cloud service 1017 to the MFD 103 in operation 714 may be completed before the completion of the transfer of the print data in operation 712, and the transfer of the print data continues in operation 716. When the reception of the recommendation information is completed, the MFD 103 controls the display of the operation panel 407 in accordance with the received recommendation information in operation 715, and the rest of the print data is received in operation 716.

Figure 8:
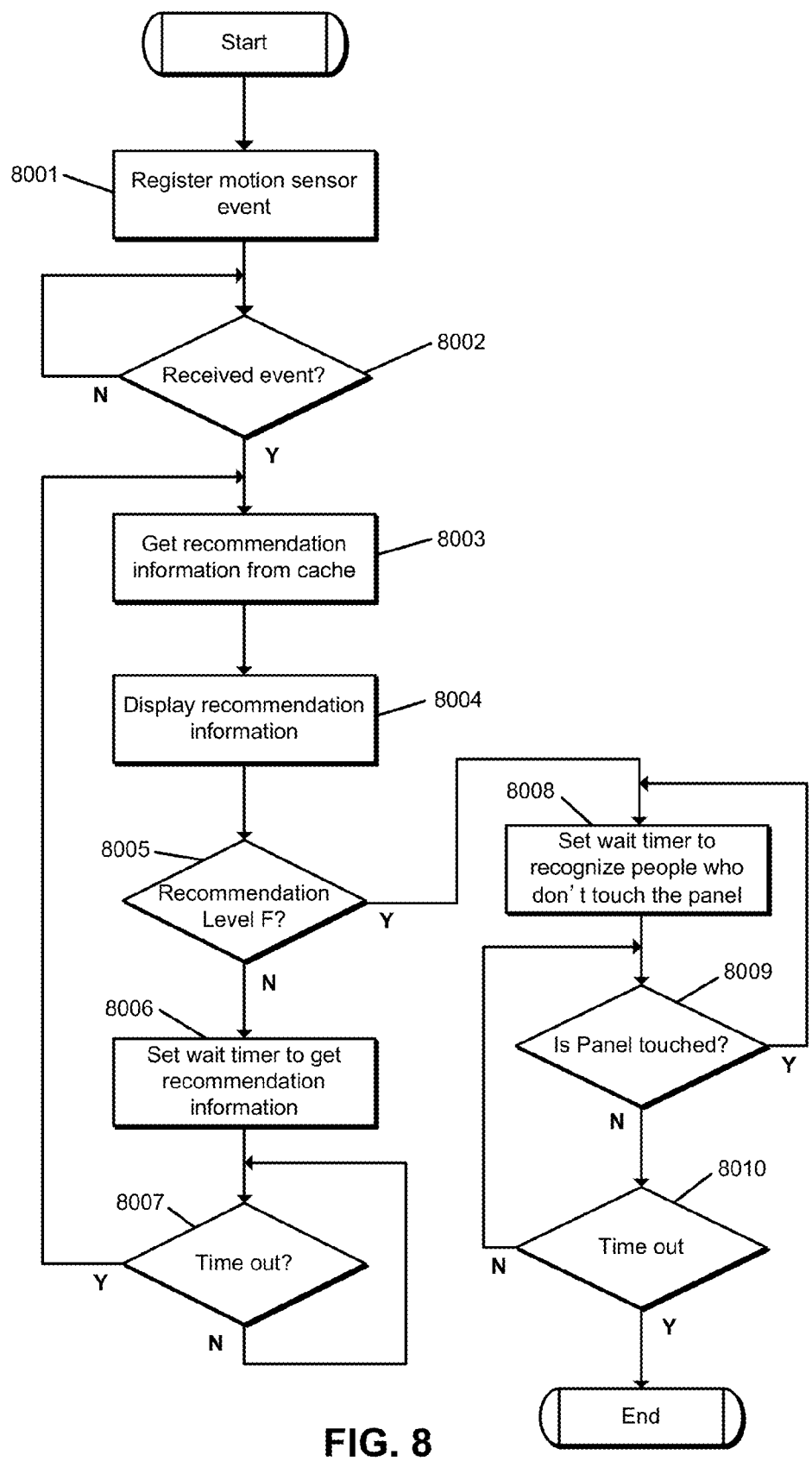
FIG. 8 is a flow chart that illustrates an example embodiment of a method that starts when an MFD detects a person.

FIG. 8 is a flow chart that that illustrates an example embodiment of a method that starts when an MFD (e.g., the MFD 103) detects a person. A motion sensor event is registered at the MFD 103 in operation 8001, and then the flow moves to operation 8002. A sensor-notification component 1023 determines whether it detects an event that indicates that a person is approaching the MFD 103 in operation 8002. If it is determined that the event is detected, the flow proceeds to operation 8003. In operation 8003, a UI module 1018 obtains recommendation information from a cache (e.g., the RAM 402) of the MFD 103. And then the UI module 1018 displays the recommendation information on the operation panel 407 in operation 8004. In operation 8005, the UI module 1018 determines whether the recommendation is level F. If it is determined that recommendation is not level F ("F"="final"), then the flow moves to operation 8006, where the UI module 1018 sets a wait timer to get further recommendation information, and the flow proceeds to operation 8007. In operation 8007, the UI module 1018 determines whether the timer has timed out. If the UI module 1018 determines that the timer has timed out, the flow returns to operation 8003. If the UI module 1018 determines that the timer has not timed out, then the flow returns to operation 8007.

If in operation 8005 it is determined that the recommendation is level F, then the flow proceeds to operation 8008. In operation 8008, the sensor-notification component 1023 or the UI module 1018 verifies the time for which the person does not touch the operation panel 407. If the panel is not touched by the person in the predetermined period of time, then in operation 8009 it is determined that the panel is not touched and in operation 8010 it is determined that a time out has occurred, and the process ends.

Figure 9:
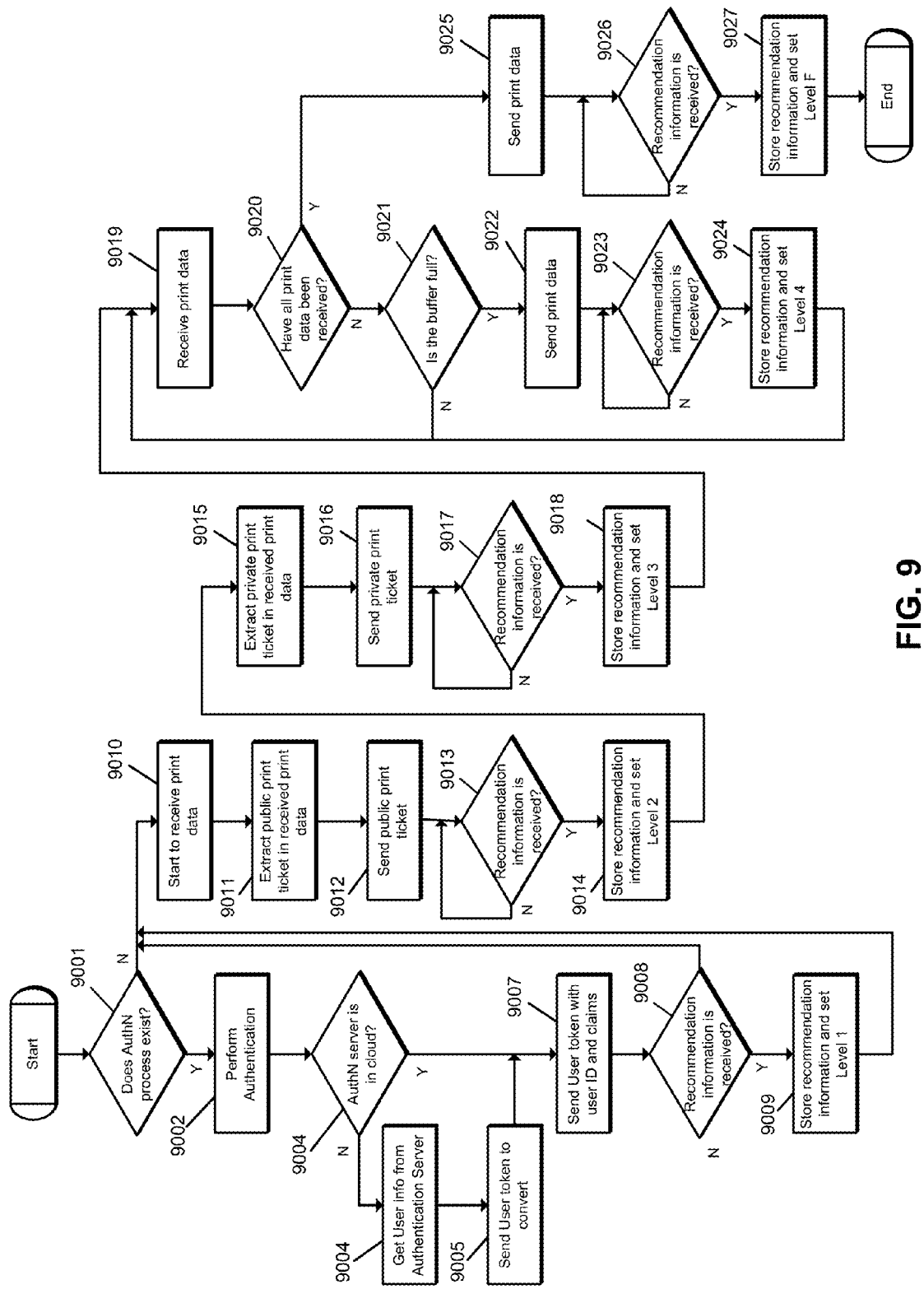
FIG. 9 is a flow chart that illustrates an example embodiment of a print process performed by an MFD.

FIG. 9 is a flow chart that illustrates an example embodiment of a print process performed by an MFD (e.g., the MFD 103). The flow starts when the MFD 103 detects a print job or a print request. In operation 9001, the authentication component 1025 determines whether an authentication process exists in the MFD 103 or not. If the authentication component 1025 determines that the authentication process does not exist, then the flow proceeds to operation 9010. If the authentication component 1025 determines that the authentication process exists, the flow moves to operation 9002, where the authentication process is performed. In operation 9002, the MFD 103 extracts user authentication information from the print job or the print request, and the MFD 103 sends it to an authentication server or the authentication service 1008. Then the MFD 103 gets a user token from the authentication service 1008 or the authentication server in response to the user authentication information.

Next the authentication component 1025 confirms whether there exists an authentication server in a cloud service 1017 in operation 9006. And if the authentication component 1025 confirms that the authentication server is not in the cloud service 1017, the flow proceeds to operation 9004, where the authentication component 1025 gets user authentication information from the on-premise authentication server. Then the authentication component 1025 sends a user token to the authentication server and gets a converted user token in operation 9005, and then the flow proceeds to operation 9007. If the authentication component 1025 confirms that the authentication server is in the cloud service 1017, the flow proceeds to operation 9007. In operation 9007, the authentication component 1025 sends the user token with a user ID and claims to a recommendation service 1001. The user token may include claims of the user and the user ID corresponding to the user. The claims include properties of the user, such as telephone numbers, an e-mail address, and a name of an organization the user belongs to.

Also, the recommendation service 1001 generates recommendation information based on the authentication information, including the user token and the user ID sent from the MFD 103, in operation 9007. For example, the recommendation service 1001 generates the recommendation information regarding documents in accordance with a viewing history or profile information corresponding to the user ID. The recommendation service 1001 generates the recommendation information, which may include a document list, for a mobile device and or cloud system.

Figure 21:
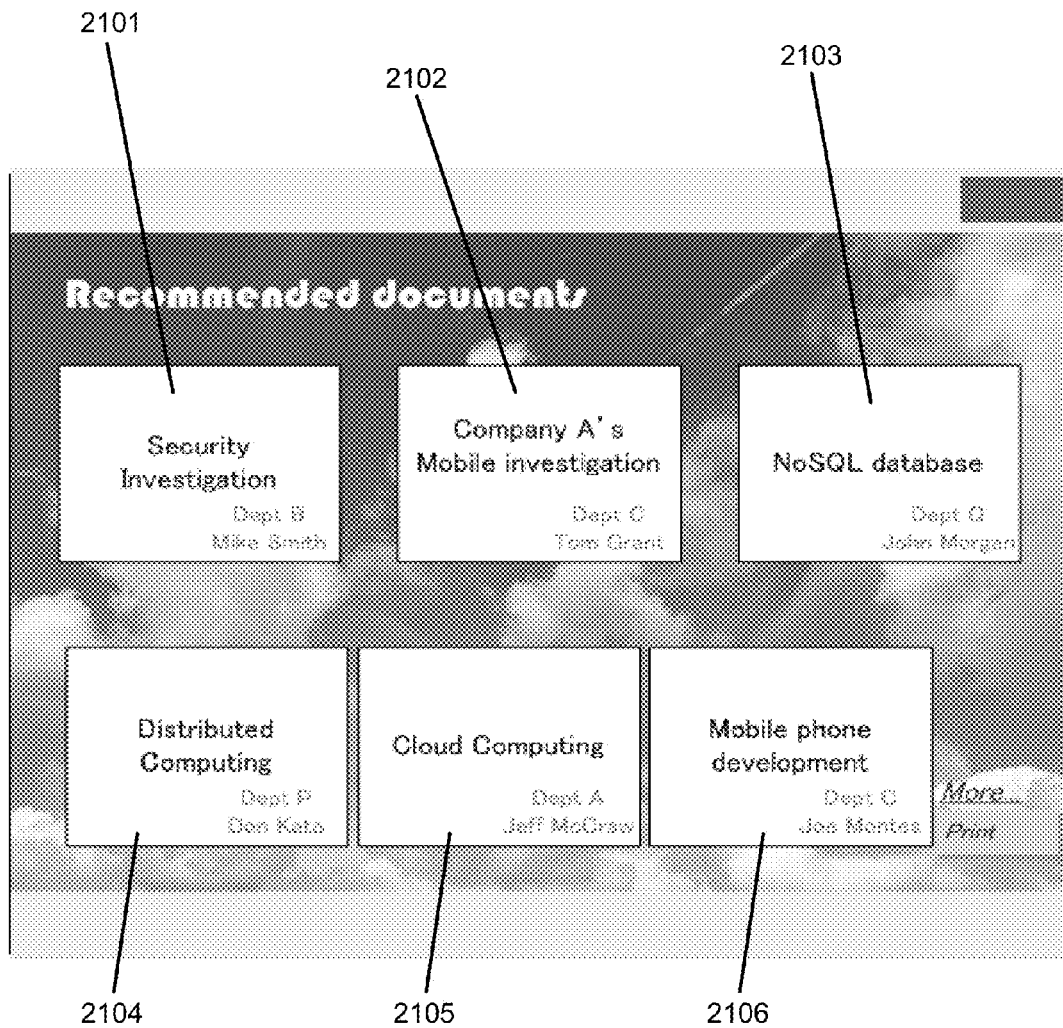

The recommendation information enables the MFD 103 to display a UI, for example as shown FIG. 21. The UIs in FIG. 21 through FIG. 25 show thumbnails of the documents indicated by thumbnails 2101-2106, 2201-2206, 2301-2306, 2401-2406 and 2501-2506. Thumbnails correspond to electronic documents stored in the MFD 103 or the cloud service 1017. If the user selects one or more of the documents shown in the UIs, the user can designate the documents as specified documents. The specified document can be operated by the MFD 103. The operations for the specified documents may include "open the document to show the contents", "print the document", etc. And if the specified document is stored in the cloud service 1017 or another service, users can instruct the MFD 103 to obtain the documents from the cloud service 1017 via the network (pull print) and print the obtained documents. When a user sends an instruction to pull print a document stored by another service, it may take a long time to download the whole document. Even in such a case, in some embodiments, FIGS. 21-24 can be displayed before completing reception of the whole document at the MFD 103. While waiting for completion of the reception of the document, the MFD 103 can display recommended documents for the user, as shown in FIGS. 21-24. Also, the document may be opened and some of the contents of the pages of the document may be displayed on the operation panel 407.

In operation 9008, the UI module 1018 determines whether recommendation information is received or not. If the UI 1018 module determines that recommendation information is not received, then the flow proceeds to operation 9010. If the UI 1018 module determines that recommendation information is received, in operation 9009 the UI 1018 module stores the recommendation information in a cache (e.g., RAM 402, an HDD 406) and sets the recommendation information to level 1, and then the flow proceeds to operation 9010.

Figure 26:
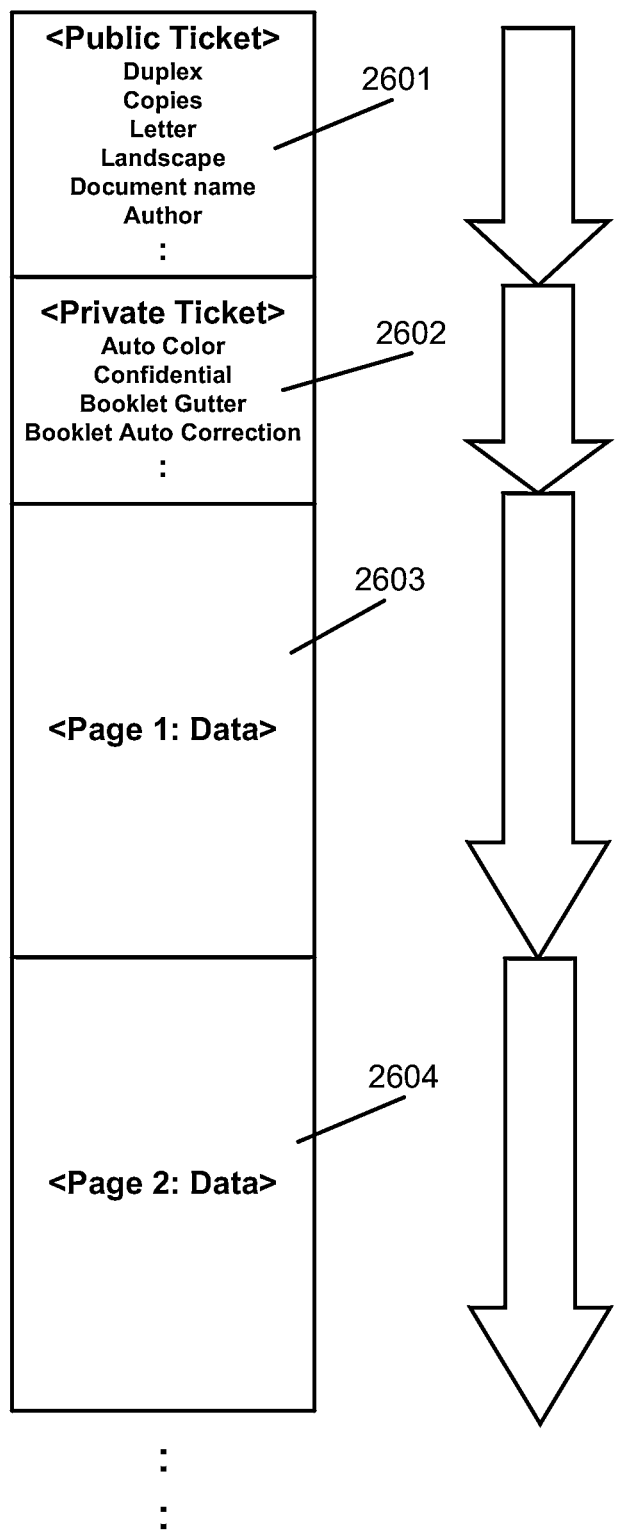
FIG. 26 shows an example embodiment of a data structure of a print job.

In operation 9010, the print/scan-data-receiver 1019 starts to receive print data, which may include a public print ticket 2601 (shown in FIG. 26). As depicted in FIG. 21, the MFD 103 may display an interface that presents document thumbnails on the operation panel 407 of the MFD 103, for example after the recommendation information in level 1 is stored in the HDD 406 in operation 9009 and before the recommendation information in level 1 is updated. The MFD 103 can display temporary recommended documents in accordance with a user token, as described in operation 9005, before the MFD 103 gets recommendation information in operations 9012, 9016, 9022, and 9025.

Figure 27:
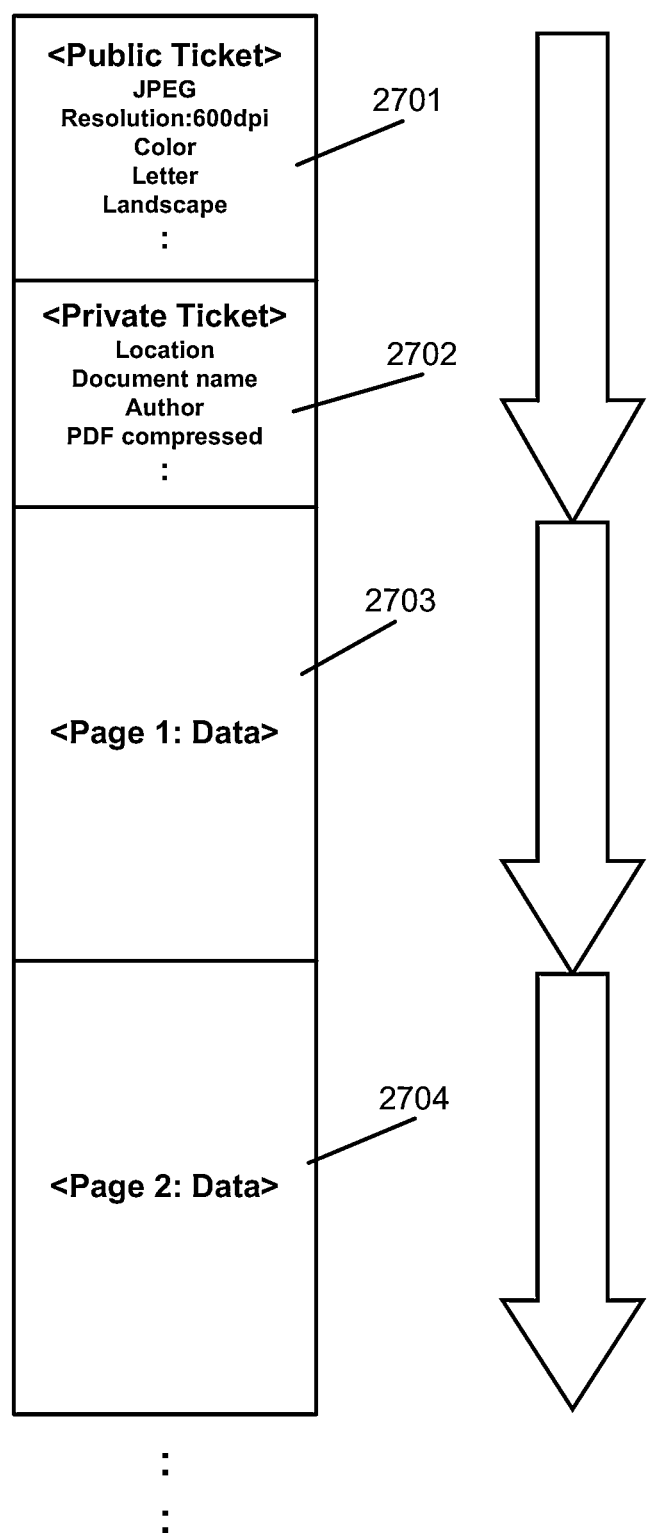
FIG. 27 shows an example embodiment of a data structure of a scan job.

After the print data, including a public print ticket 2601, is received, the flow proceeds to operation 9011. The public print ticket 2601 may include print settings such as duplex, copies, letter, landscape, document name, author, and other settings. FIG. 26 is an example of a data structure of a print job that includes print tickets 2601-2602 and print data 2603-2604. Print data 2603 and print data 2604 include document contents (e.g., text and images and their formatting) and may be received and obtained step-by-step at the MFD 103. At first, not all of the contents in FIG. 27 are available at the MFD 103. First, the public print ticket 2601 is obtained, and then the obtained public print ticket 2601 is sent to the cloud service 1017 to generate recommendation information. And second, the private print ticket 2602 is obtained by the MFD 103, and the private print ticket may be sent to the cloud service 1017 to generate recommendation information. And then print data 2603-2604 may be obtained for each page, and then the print data may be sent for each page in order to generate recommendation information. Recommendation information may be received step-by-step in accordance with sending the obtained data from the MFD 103 to the cloud service 1017.

In operation 9011, a data-extraction component 1020 extracts the public print ticket 2601 from the print data received in operation 9010, and a metadata-send component 1022 sends the public print ticket 2601 to the cloud service 1017 in operation 9012. Also in operation 9012, the recommendation service 1001 generates recommendation information, for example by using title information regarding the document included in the public print ticket 2601 sent from the MFD 103. Also for example, the recommendation service 1001 may generate recommendation information in accordance with a document title indicating the words "mobile" and "cloud", and thus the recommendation service 1001 may generate a list that includes documents regarding mobile and cloud. The recommendation information may be presented on a UI of the MFD 103, for example the UI of FIG. 22.

Figure 22:
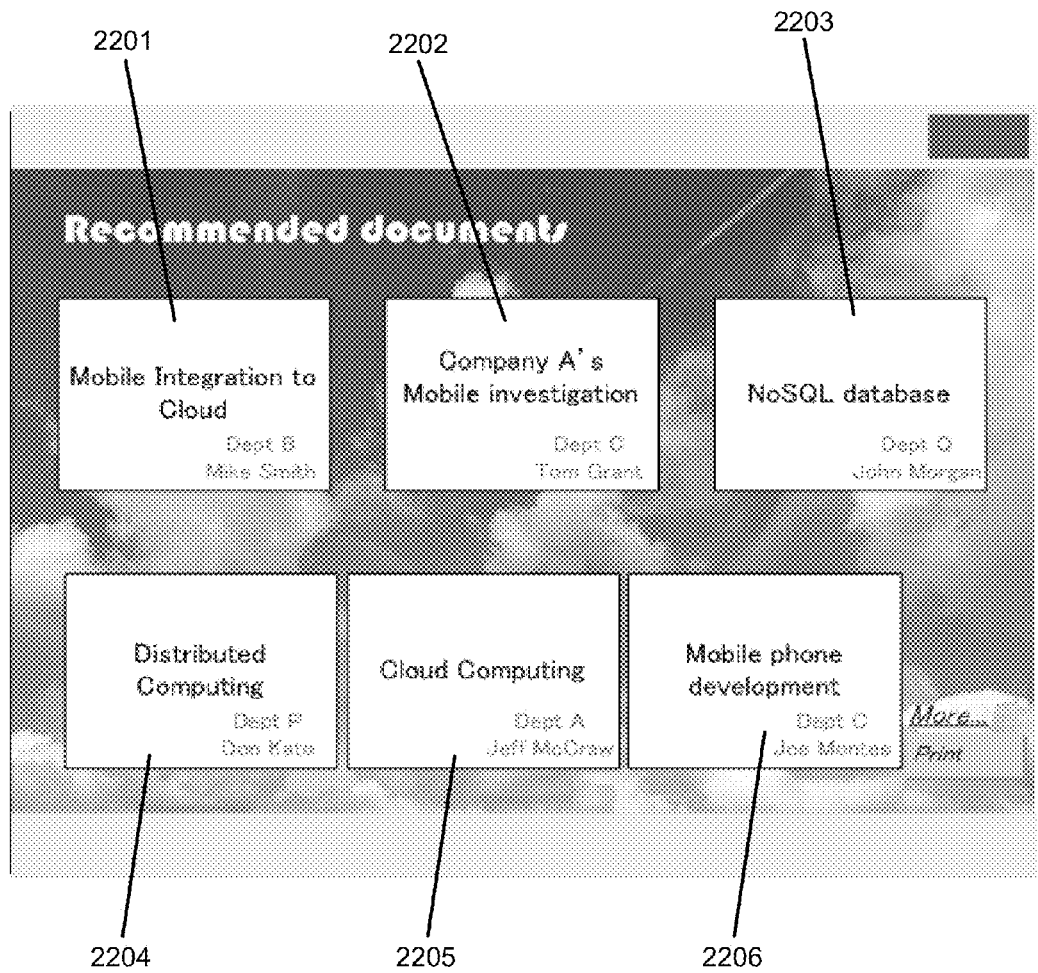

Next, in operation 9013, it is determined (e.g., by the UI Module 1018) if recommendation information is received. If the UI module 1018 determines that recommendation information is not received in operation 9013, then the flow moves to operation 9015. If the UI module 1018 determines that recommendation information is received in operation 9013, then the flow moves to operation 9014, in which the UI module 1018 stores the recommendation information in the RAM 402 or the HDD 406 as a cache and sets the level of the recommendation information to a level 2. As depicted in FIG. 22, the MFD 103 may display an interface that presents document thumbnails on the operation panel 407 of the MFD 103 in operation 9014 before the recommendation information in level 2 is updated. The MFD 103 can display temporary (e.g., interim) recommended documents in accordance with the public print ticket described in operation 9012 before the MFD 103 gets recommendation information in operations 9016, 9022, and 9025. In this example, a display that includes the recommendation information in FIG. 21 is changed into a display that includes the recommendation information in FIG. 22, in accordance with the public document name in the public print ticket as indicated by thumbnail 2201 in FIG. 22. Some information that is associated with thumbnail 2201 can be included in the public print ticket sent at operation 9012 in FIG. 9.

Figure 23:
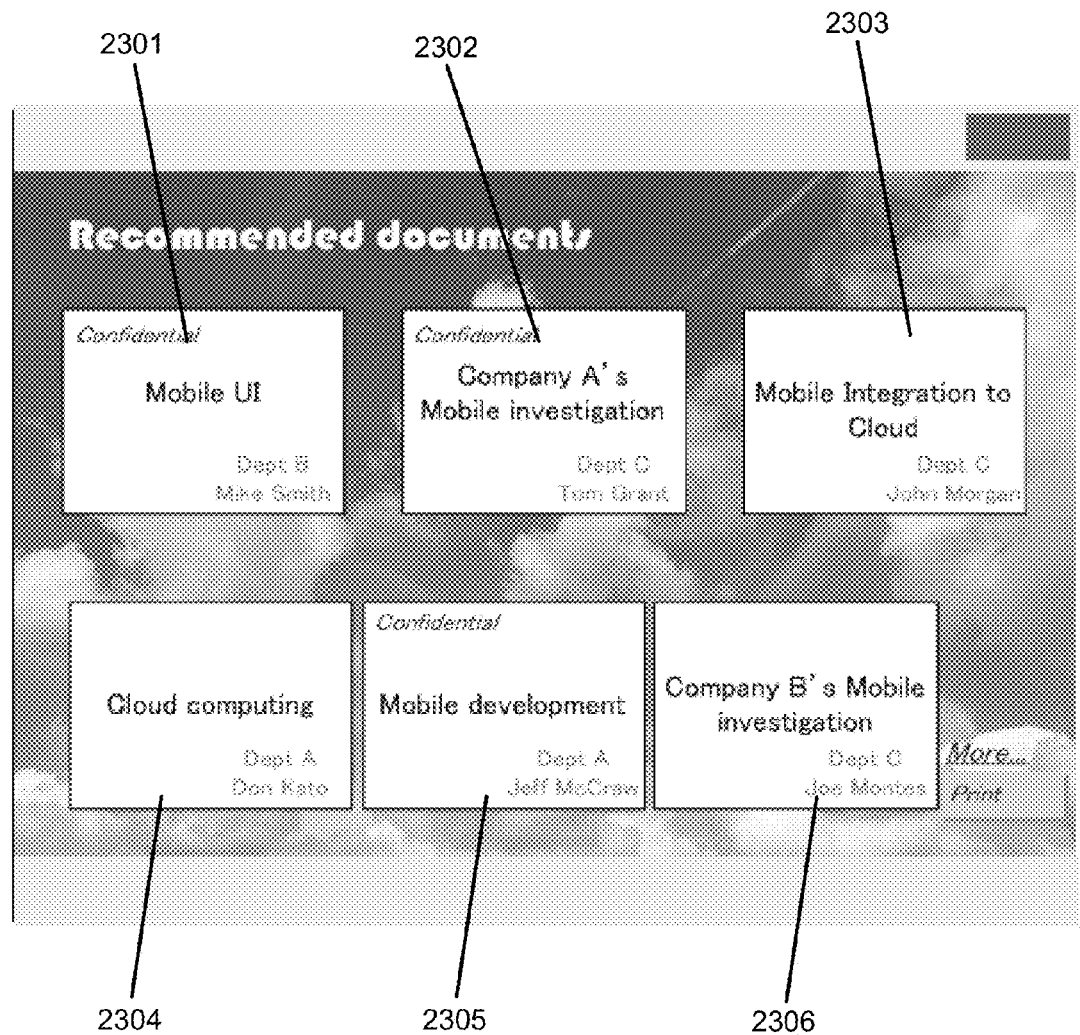

After operation 9014, the private print ticket (e.g., the private print ticket 2602 in FIG. 26) is received, and the flow proceeds to operation 9015. The private print ticket may include vendor-specific print settings, like auto color, confidential, booklet gutter, or booklet auto correction, as shown in the private print ticket 2062 of FIG. 26. In operation 9015, the data-extraction component 1020 extracts the private print ticket 2602 from the received print data (e.g., received beginning in operation 9010), and the metadata-send component 1022 sends the private print ticket 2602 to the cloud service 1017 in operation 9016. The cloud service 1017 (e.g., the recommendation service 1001) may generate recommendation information by using information included in the private print ticket 2602 in operation 9016. For example, the recommendation service 1001 generates recommendation information in accordance with the private print ticket 2602, including a watermark that indicates "confidential" and department names, like department A, B, and C. The recommendation information is sent to the MFD 103, and the MFD 103 displays the recommendation information, for example by presenting the UI shown in FIG. 23. The UI in FIG. 23 shows confidential documents.

In operation 9017, the UI module 1018 determines if recommendation information is received. If recommendation information is determined to not have been received, then the flow waits at operation 9017. If recommendation information is determined to have been received, then the flow proceeds to operation 9018, where the UI module 1018 stores the recommendation information in a RAM 402 or an HDD 406 as a cache and sets the level of the recommendation information to level 3. As depicted in FIG. 23, in operation 9018 the MFD 103 may display an interface which presents document thumbnails on the operation panel 407 of the MFD 103 before the recommendation information in level 3 is updated. The MFD 103 can display temporary recommended document thumbnails generated based on a private print ticket, as described in operation 9016, before the MFD 103 gets recommendation information in operations 9022 and 9025. In some embodiments, the interface in FIG. 23 is generated by updating the interface in FIG. 22 according to the received level 3 recommendation information, which, in one example, is based on the private print ticket that includes "confidential" attribute information, as indicated by thumbnails 2301, 2302 and 2305.

Then the flow proceeds to operation 9019. In operation 9019, the print/scan-data-receiver 1019 receives the print data. Next, in operation 9020, the print/scan-data-receiver 1019 determines whether all contents of the print data have been received. If the print/scan-data-receiver 1019 determines that all contents of the print data have not been received (operation 9020=No), then the MFD 103 determines if the buffer is full or not in operation 9021. If the MFD 103 determines that the buffer is not full, then the print/scan-data-receiver 1019 continues receiving the print data in operation 9019. If the buffer is full (operation 9021=Yes), then in operation 9022 the print/scanned-data send component 1024 sends the contents of the print data stored in the buffer of the MFD 103 to the cloud service 1017.

Also in operation 9022, the recommendation service 1001 generates recommendation information based on information included in the partial print data sent from the MFD 103 in operation 9022. For example, the recommendation service 1001 generates recommendation information in accordance with the partial print data that includes contents of "Company A's mobile."

Then in operation 9023 the UI module 1018 determines whether the recommendation information has been received or not. If the UI module 1018 determines that the recommendation information is received, then in operation 9024 the UI module 1018 stores the recommendation information in the RAM 402 or the HDD 406 and a level of the recommendation information is set to level 4.

Figure 24:
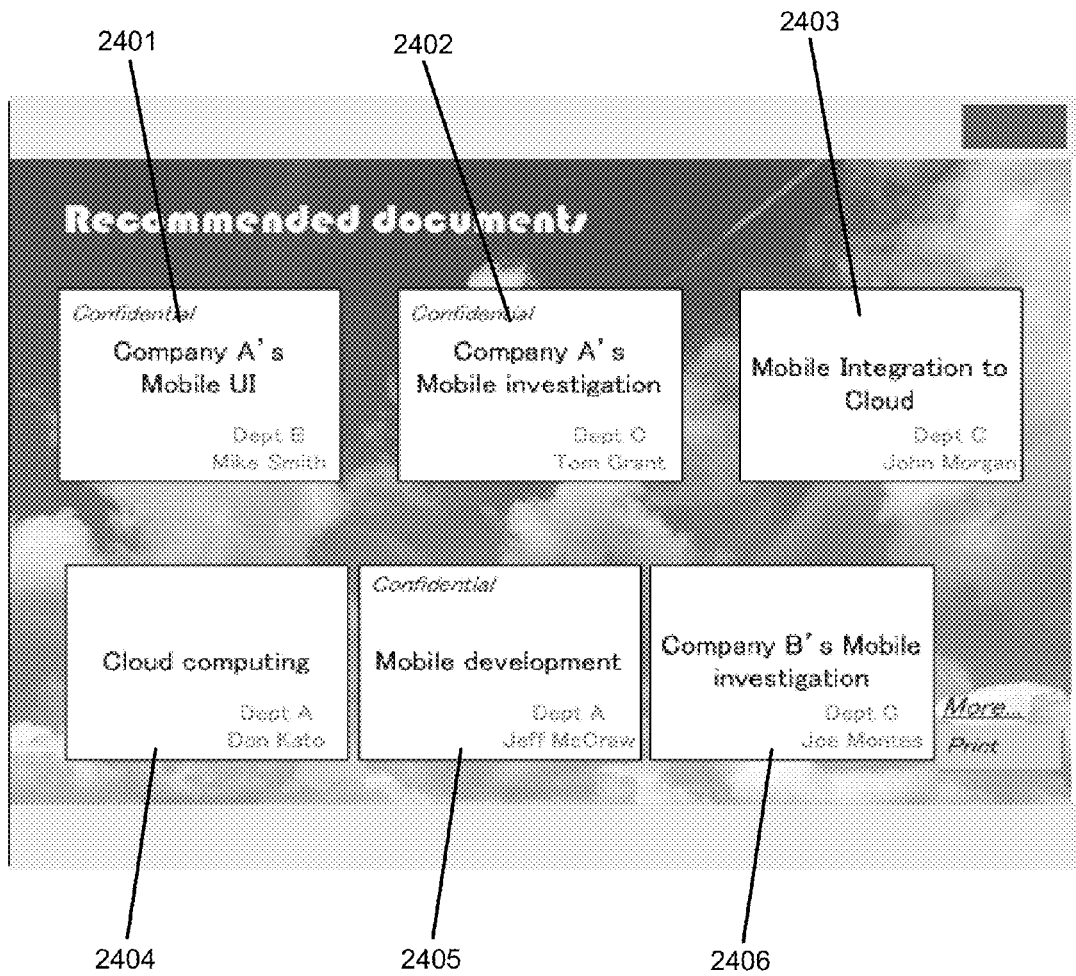

The recommendation information may enable the MFD 103 to display the UI shown in FIG. 24. The UI in FIG. 24 shows thumbnails that represent mobile-related documents. As depicted in FIG. 24, the MFD 103 may display an interface that presents document thumbnails on the operation panel of the MFD 103 before the recommendation information in level 4 is updated. The MFD 103 can display temporary recommended documents in accordance with some of the print data received before operation 9022. Before the MFD 103 gets all of the print data in operation 9025, the MFD 103 can display recommendation information based on the print data. After operation 9024, the flow returns to operation 9019.

If in operation 9020 the print/scan-data-receiver 1019 determines that all of the print data have been received (operation 9020=Yes), then the print/scanned-data-send component 1019 sends the received print data to the cloud service 1017 in operation 9025. The recommendation service 1001 may generate recommendation information based on all or nearly all of the print data sent from the MFD 103 in operation 9025. For example, the recommendation service 1001 can generate recommendation information in accordance with all or nearly all of the print data, which includes the whole or almost the whole print contents. The recommendation information may enable the MFD 103 to show the UI shown in FIG. 25. The UI in FIG. 25 shows thumbnails that represent mobile and confidential documents.

In operation 9026, it is determined if the recommendation information is received from the cloud service 1017 at the MFD 103. If not, the flow waits at operation 9026. If yes, then the flow moves to operation 9027, where the print/scan-data-receiver 1019 receives and stores the data in the RAM 402 or the HDD 406 and a level of the recommendation information is set to level F.

Figure 25:
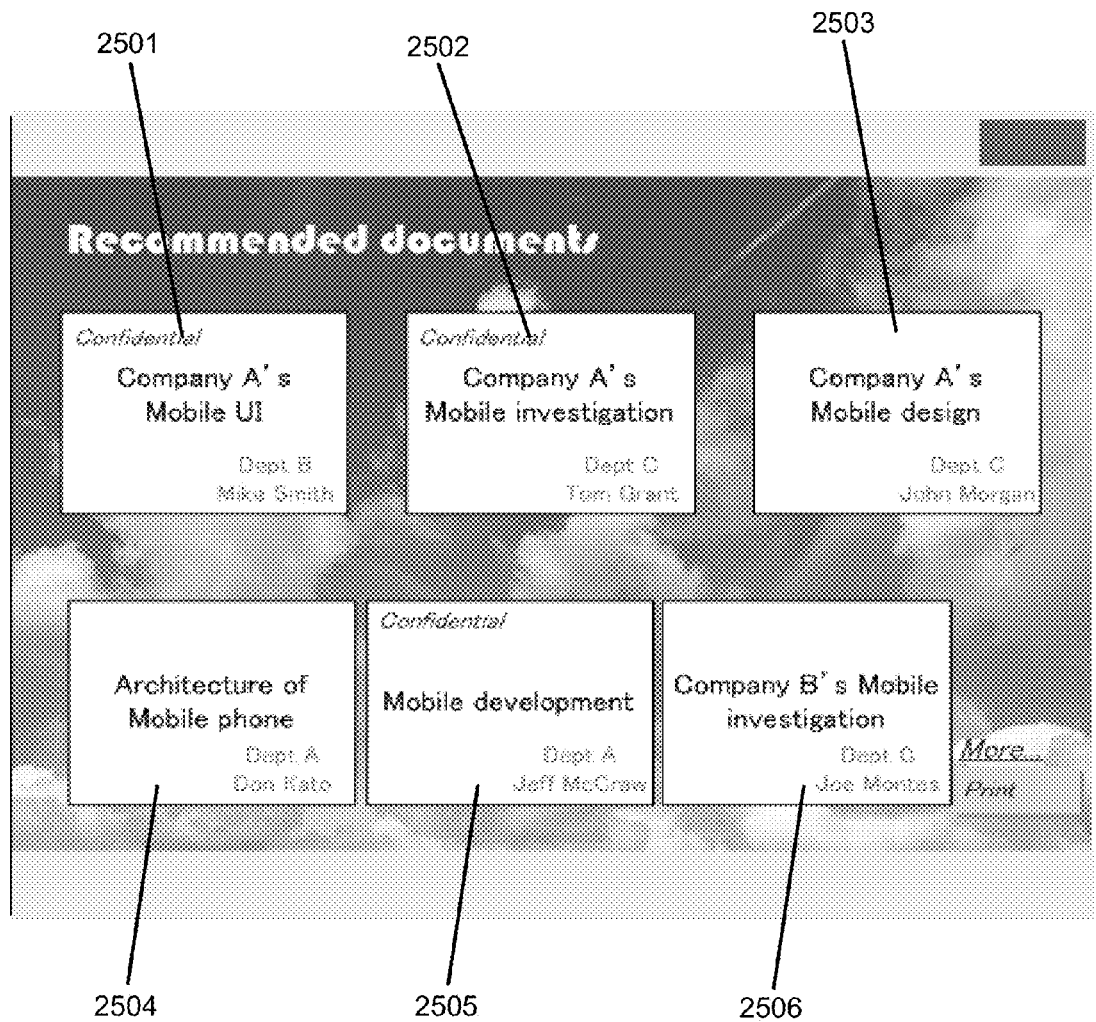

As depicted in FIG. 25, the MFD 103 can display an interface that presents document thumbnails on the operation panel of the MFD 103 in operation 9027. The MFD 103 can display the final recommended document thumbnails that were generated in accordance with the received print data. As described above, the MFD 103 can display recommendation information step-by-step in accordance with information obtained step-by-step by the MFD 103. The document thumbnails in FIG. 25 are determined in accordance with all or nearly all of the print data.

As mentioned above, the MFD 103, which communicates with the cloud service 1017 of the server(s) 101, includes the operation panel 407 and a CPU 401 that controls the scanner 411 or the communication I/F 404 to obtain document data. The communication I/F 404 sends, to the client terminal 104, setting information and the document data. Setting information includes, for example, the scan ticket or the print ticket. And the communication I/F 404 sends the setting information before the scanner 411 or the communication I/F 404 obtains all of the document data.

The communication I/F 404 receives recommendation information, which indicates one or more recommended documents. The recommendation information is generated by the server(s) 101 in accordance with the print ticket or the scan ticket, and the communication I/F 404 further receives additional recommendation information, which indicates additional recommended documents. And more recommendation information is generated by the server(s) 101 in accordance with the document data sent by the communication I/F 404.

The CPU 401 controls a display of the operation panel 407 to display recommendations in accordance with the recommendation information received by the communication I/F 404, even before the communication I/F 404 receives additional recommendation information. The CPU 401 controls the update of the display in accordance with additional recommendation information in response to receiving the additional recommendation information. In an image-forming apparatus, the sending unit sends the setting information in response to the obtaining unit's obtaining of the user's instruction to perform an image-forming process, the receiving unit receives the first recommendation information corresponding to the setting information, and the update unit updates the interface of a display unit (e.g., operation panel 407) in accordance with the recommendation information.

Figure 10:
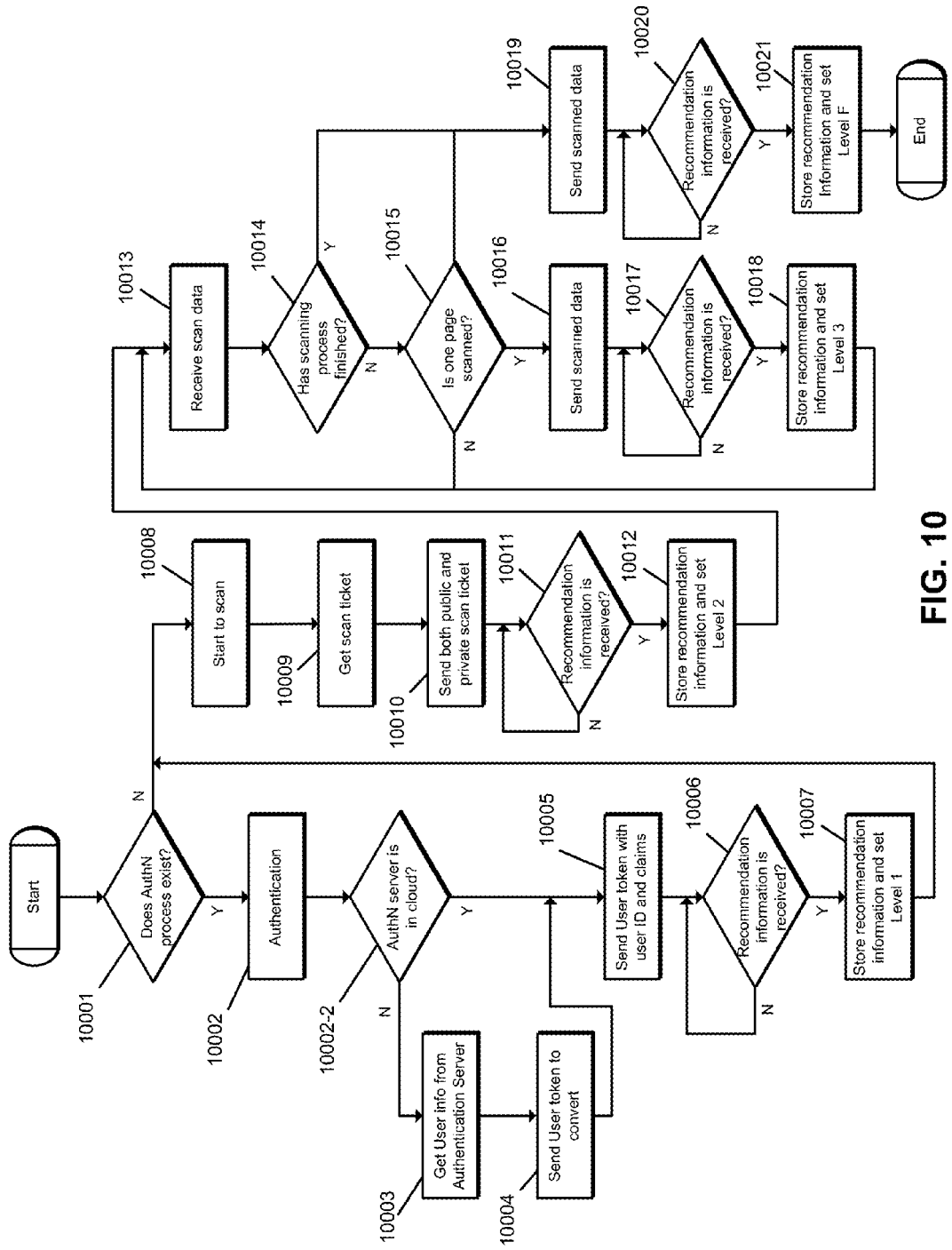
FIG. 10 is flow chart that illustrates an example embodiment of a print-process performed by an MFD.

FIG. 10 is a flow chart that illustrates an example embodiment of a print-process performed by an MFD (e.g., the MFD 103). The flow starts when a user inputs user authentication information to the MFD 103. In operation 10001, the authentication component 1025 determines whether an authentication process exists in the MFD 103 or not. If the authentication component 1025 determines that the authentication process exists in the MFD 103, then the authentication is performed in operation 10002. The process in operation 10002 is the same as or similar to the process in operation 9002. And then the authentication component 1025 confirms whether an authentication server is located in the cloud service 1017 or not in operation 10002-2. If the authentication component 1025 confirms that the authentication server is not located in the cloud service 1017, the flow proceeds to operation 10003, and the authentication component 1025 gets user authentication information from the authentication server (also referred to herein as an "AuthN server"). Then the authentication component 1025 sends a user token to the authentication server and gets a converted user token in operation 10004. The flow then proceeds to operation 10005. Also, if the authentication component 1025 confirms that the authentication server is in the cloud service 1017, then the flow proceeds to operation 10005.

In operation 10005, the authentication component 1025 sends the user token with the user ID and claims to the cloud service 1017. In operation 10006, the UI module 1018 determines whether recommendation information is received or not. If the UI module 1018 determines that recommendation information is received, the UI module 1018 stores the recommendation information in the HDD 406 as a cache and sets the recommendation information to level 1 in operation 10007. Then the flow proceeds to operation 10008. Also, if the UI module 1018 determines that recommendation information is not received, then the flow proceeds to operation 10008.

In operation 10008, the print/scan-data-receiver 1019 starts scanning sheets of paper documents. FIG. 27 shows an example of a data structure of a scan job. Next, a public scan ticket 2701 and a private scan ticket 2702 are obtained in operation 10009, and then the flow proceeds to operation 10010.

In operation 10010, the metadata-send component 1022 sends the public scan ticket 2701 and the private scan ticket 2702 to the cloud service 1017. Also, in operation 10010 the recommendation service 1001 generates recommendation information based on information that is included in the public scan ticket 2701 or the private scan ticket 2702 sent from the MFD 103. The public scan 2701 ticket may include information regarding image formats, scanning resolutions, and scanning modes, which indicate color or black & white, and orientation of the scanned documents. The private scan ticket 2702 may include location information, document names, author's information, PDF compression modes, etc. The flow then moves to operation 10011.

In operation 10011, the UI module 1018 determines if the recommendation information has been received. If not, then the flow waits at operation 10011. If yes, then the flow moves to operation 10012, where the UI module 1018 stores the recommendation information in the RAM 402 or the HDD 406 in a cache. Also, the UI module 1018 sets the level of the recommendation information to level 2 in operation 10012. The flow then moves to operation 10013.

In operation 10013, the print/scan-data-receiver 1019 obtains the contents of the scanned data. Next, in operation 10014, the print/scan-data-receiver 1019 determines whether all of the sheets of the paper documents have been scanned or not. If the print/scan-data-receiver 1019 determines that all of the sheets of the paper documents have not been scanned in operation 10014, then the flow proceeds to operation 10015, where the MFD 103 determines whether one sheet of the page has been scanned or not. If it is determined that at least one sheet of the pages has not been scanned, then the flow returns to operation 10013. If in operation 10015 it is determined that at least one sheet of the pages has been scanned, then the flow proceeds to operation 10016.

In operation 10016, the print/scanned-data-send component 1024 sends the scanned data (including, for example, page 1 data 2703 or page 2 data 2704) to the recommendation service 1001. Also in operation 10016, the recommendation service 1001 generates recommendation information based on information included in the scanned data received from the MFD 103. For example, the recommendation service 1001 may generate recommendation information in accordance with the partial scanned data, which includes the partial contents of one or more documents. The recommendation information may enable the MFD 103 to show a UI indicating the recommendation information.

Then the UI module 1018 determines whether the recommendation data is received or not in operation 10017. If the UI module 1018 determines that recommendation information is received, then in operation 10018 the UI module 1018 stores the recommendation information in the RAM 402 or the HDD 406 and sets a level of the recommendation information to level 3. The flow then returns to operation 10013.

If in operation 10014 the print/scan-data-receiver 1019 determines that all of the sheets of the paper document have been scanned, then the flow proceeds to operation 10019. In operation 10019, the print/scanned-data-send component 1019 sends the scanned data to the cloud service 1017. The recommendation service 100 generates recommendation information based on the scanned data received from the MFD 103 in operation 10019. For example, the recommendation service 1001 may generate recommendation information in accordance with all or almost all of the scanned data. The recommendation information may enable the MFD 103 to show the UI shown in FIG. 25. The UI in FIG. 25 shows document thumbnails of recommended documents in the operation panel of the MFD 103.

If in operation 10020 the recommendation information is received from the cloud service 1017 at the MFD 103, then in operation 10021 the print/scan-data-receiver 1019 receives and stores the data in the RAM 402 or the HDD 406 and sets a level of the recommendation information to level F. If in operation 10020 the recommendation information is not received, then the flow waits at operation 10020.

Figure 11:
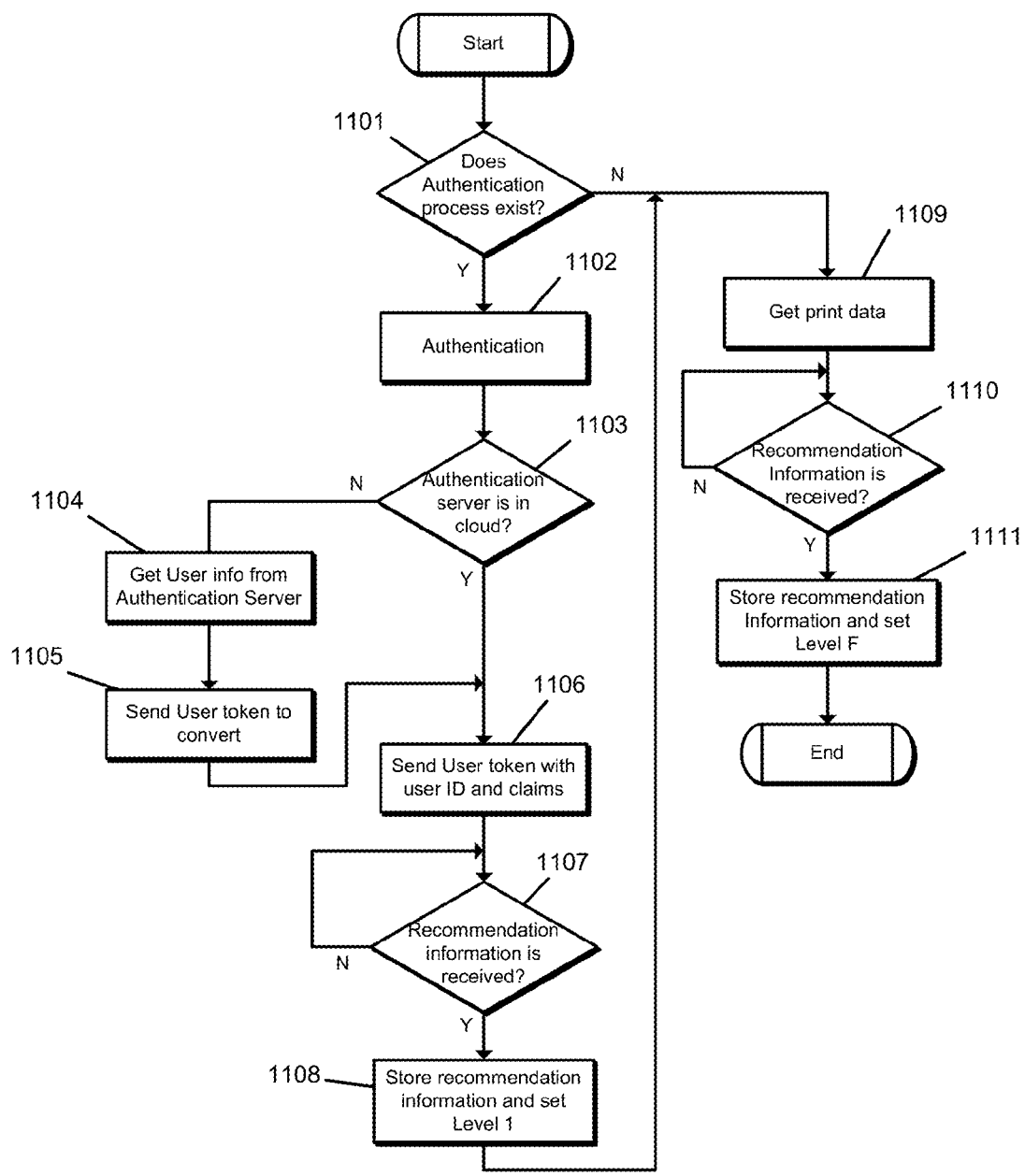
FIG. 11 is a flow chart that illustrates an example embodiment of pull printing.

FIG. 11 is flow chart that illustrates an example embodiment of pull-printing. An authentication component 1025 determines whether an authentication process exists or not at in operation 1101. If the authentication component 1025 determines that the authentication process exists, then the flow proceeds to operation 1102. If it is determined that the authentication process does not exist, then the flow proceeds to operation 1109.

In operation 1102, the authentication component 1025 performs an authentication process, and next, in operation 1103, the authentication component 1025 determines whether an authentication server is in the cloud service 1017. If yes, then the flow moves to operation 1106, where the MFD 103 sends user authentication information to the authentication service 105. The authentication service 105 issues a user token in response to the user authentication information and sends the user token to the MFD 103.

And if the authentication component 1025 determines that the authentication server is not in the cloud service 1017 or is not active in the cloud service 1017, then the flow proceeds to operation 1104, where the authentication component 1025 gets user authentication information from the authentication server. Then the authentication component 1025 sends a user token to the authentication server and gets a converted user token in operation 1105, and the flow proceeds to operation 1106, where the authentication component 1025 sends the user token with user ID and the claims to the authentication service 105.

Next, in operation 1107, the UI module 1018 determines whether recommendation information is received or not. If the UI module 1018 determines that recommendation information is not received in operation 1107, then the flow waits at operation 1107. If the UI module 1018 determines that recommendation information is received, the UI module 1018 stores the recommendation information in the RAM 402 or the HDD 406 in a cache and sets the recommendation information to level 1 in operation 1108, then the process proceeds to operation 1109.

In operation 1109, the MFD 103 requests print data from the cloud service 1017. Then the MFD 103 gets the recommendation information from the cloud service 1017. The recommendation information is generated in the cloud service 1017 based on the print data. If the print data requested in operation 1109 is huge, then the print/scan-data-receiver 1019 may receive recommendation information before it finishes receiving the print data requested in operation 1109. In operation 1110, it is determined if the recommendation information is received. If yes, then the received recommendation information is cached and the level is set to level F, and next the process ends. If not, then the flow waits at operation 1110.

Figure 12:
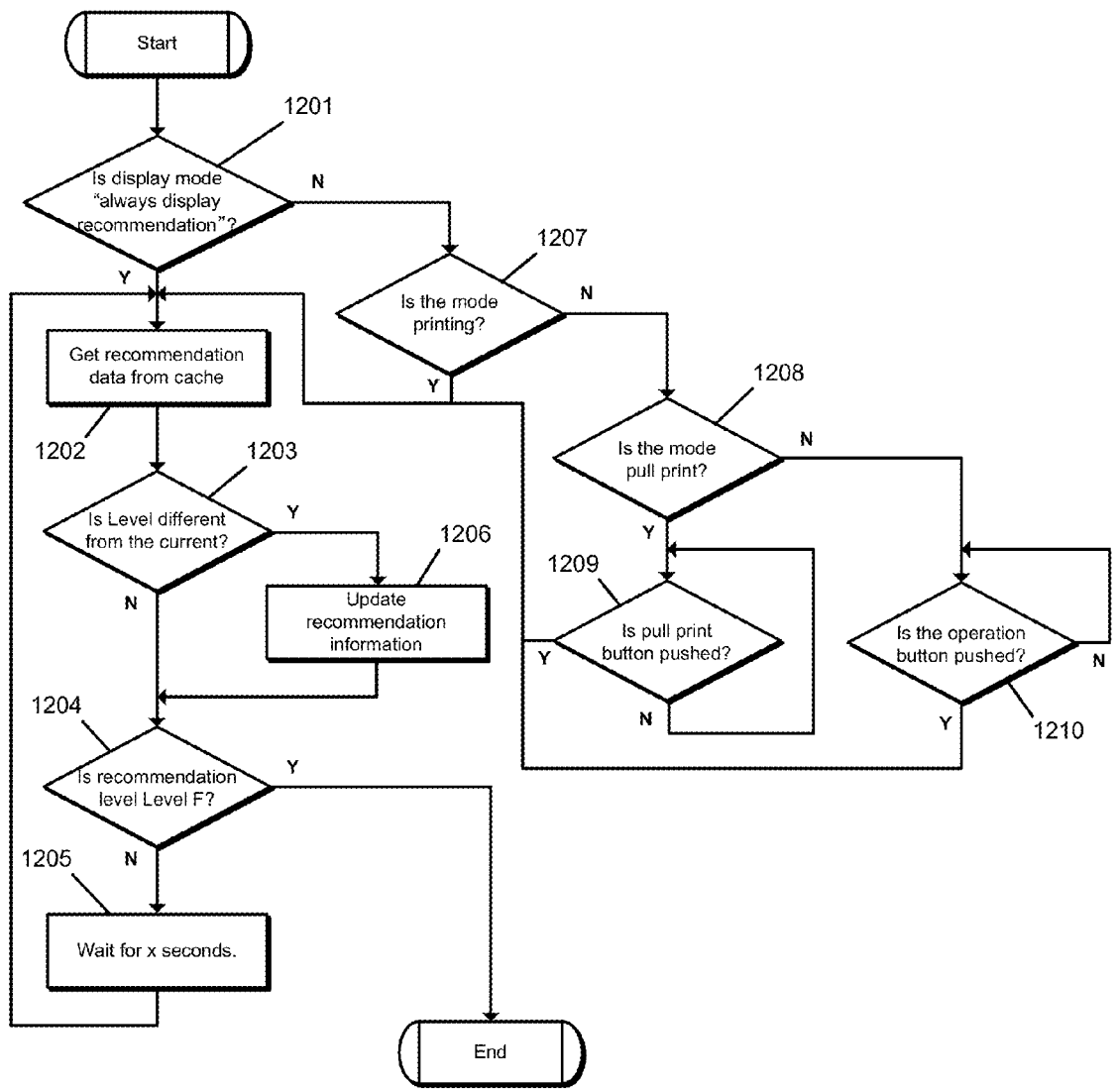
FIG. 12 is a flow chart that illustrates an example embodiment a method for controlling the display of an operation panel by a UI module.

FIG. 12 is a flowchart that illustrates an example embodiment of a method for controlling the display of an operation panel (e.g., the operation panel 407) by a UI module (e.g., the UI module 1018 in FIG. 1). The flow starts when the MFD 103 is powered on. The UI module 1018 determines whether the display is set to the mode in which recommendation information should be always displayed in operation 1201. If yes (operation 1201=Yes), the flow proceeds to operation 1202. If not (operation 1201=No), then the flow proceeds to operation 1207.

In operation 1202, the UI module 1018 gets recommendation information from the cache and proceeds to operation 1203. In operation 1203, the UI module 1018 determines whether the level in the cache is changed from the current level. If it is determined that the level in the cache is changed (operation 1203=Yes), then in operation 1206 the UI module 1018 updates the current level and contents of the recommendation information with the level and the contents of the recommendation information in the cache. Also, the updated recommendation information is displayed on the operation panel 407 in operation 1206, and then the flow proceeds to operation 1204. In operation 1204, the UI module 1018 checks if the current level of the recommendation information is level F. If the current level is level F, the process ends. If the current level is not F, then in operation 1205 the UI module 1018 waits for a predetermined number of seconds, and then the flow returns to operation 1202.

In operation 1207, the UI module 1018 checks whether the operation mode of the MFD 103 is set to a printing mode. If it is determined that the MFD 103 is set to the printing mode, the flow proceeds to operation 1202. The printing mode means the MFD 103 is in a mode in which the MFD 103 is receiving print data from a client terminal 104 or another computer and the MFD 103 is printing the print data. In this case, the MFD 103 may display the recommendation information on the operation panel 407 in operation 1202 through operation 1206. If it is not determined that MFD 103 is set in the printing mode, the flow proceeds to operation 1208. In operation 1208, the UI module 1018 checks whether the operation mode of the MFD 103 is set to a pull print mode. If the UI module 1018 determines that the operation mode of the MFD 103 is set to a pull print mode, then the flow proceeds to operation 1209. In operation 1209, the UI module 1018 waits for the user's instruction for a pull print request via the operation panel 407. If the UI module detects the user's instruction for the pull print request (operation 1209=Yes), then the flow proceeds to operation 1202.

If in operation 1208 it is not determined that the MFD 103 is set to a pull print mode, then the flow proceeds to operation 1210. In operation 1210, the UI module 1018 waits for user's activation of an operation button of the MFD 103. If the user's activation of the operation button is detected in operation 1210, the flow proceeds to operation 1202.

The UI module 1018 enables the MFD 103 to avoid displaying recommendation information that hinders the user's operation. Users may enjoy recommendation information displayed on the operation panel 407 while they do not operate the operation panel 407.

Figure 13:
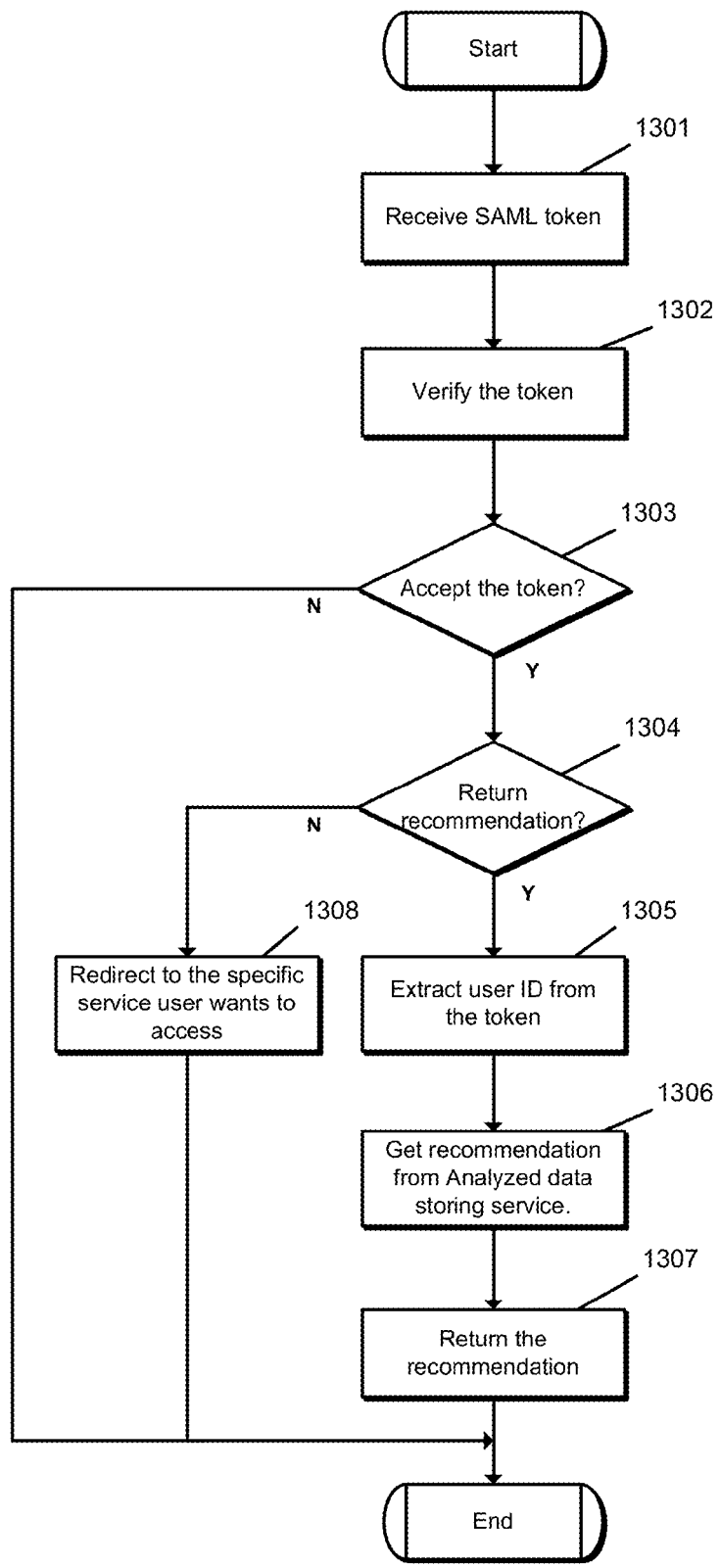
FIG. 13 is a flow chart that illustrates an example embodiment of the operations performed by an authentication service.

FIG. 13 is a flow chart that illustrates an example embodiment of the operations performed by an authentication service (e.g., the authorization/authentication service 1008 in FIG. 1). When the authorization/authentication service 1008 is initialized, the flow starts. In operation 1301, a SAML token is received from the MFD 103. The authorization/authentication service 1008 verifies the SAML token in operation 1302. The SAML token is one of the embodiments of the user token mentioned above. It includes a user ID, claims, and credential information, and it may be signed and encrypted by using public-key information. Next, in operation 1303, the authorization/authentication service 1008 determines whether to accept the token. If the authorization/authentication service 1008 determines it does not accept the token (operation 1303=No), then the flow ends. If the authorization/authentication service 1008 determines it accepts the token (operation 1303=Yes), then the flow proceeds to operation 1304, where the authorization/authentication service 1008 determines whether a recommendation should be returned.

If the authorization/authentication service 1008 determines that a recommendation should not be returned (operation 1304=No), then the flow proceeds to operation 1308, where the process is redirected to the specific service that the user wants to access. If the authorization/authentication service 1008 determines that the recommendation should be returned (operation 1304=Yes), then the authorization/authentication service 1008 extracts the user ID from the user token in operation 1305, and, in operation 1306, gets recommendation information from an analyzed-data-storing service 1011. Then in operation 1307 the authorization/authentication service 1008 returns the recommendation information that corresponds to the user ID or the user profile information in the token to the MFD 103. The flow ends after operation 1307.

FIG. 14A is a flow chart that illustrates an example embodiment of the operations performed by a document-store service (e.g., the document-store service 1010) for a scan process.

The document-store service 1010 receives a SAML token and the scan ticket from an MFD 103 in operation 1401. In operation 1402, the document-store service 1010 stores the scan ticket in a database. Next, in operation 1403, the document-store service 1010 checks whether recommendation information should be returned. When it is determined that the recommendation information should not be returned (operation 1403=No), then the process is terminated. When it is determined that the recommendation information should be returned (operation 1043=Yes), then the flow moves to operation 1404. In operation 1404 the document-store service 1010 sends a user ID extracted from the received SAML token and the document ID generated by the document-store service 1010 to the analyzed-data-storing service 1011. In operation 1405 the document-store service 1010 gets recommendation information from the analyzed-data-storing service 1011. The recommendation information is sent to the MFD 103 in operation 1406.

Figure 15A:
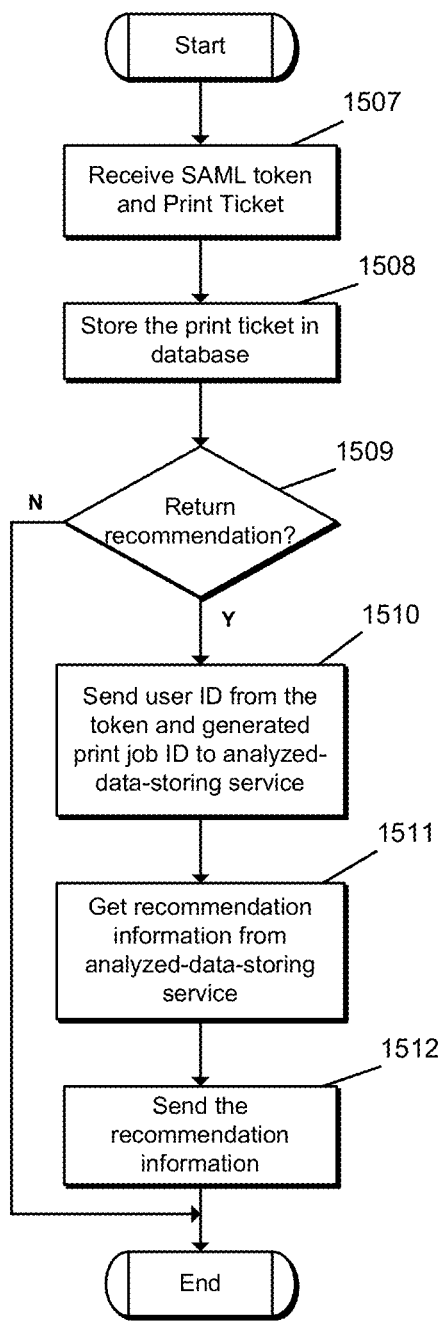
FIG. 15A is a flow chart that illustrates an example embodiment of operations performed by a document-store service for a print process.

If the scan ticket in FIG. 14A is replaced by a print ticket, a similar flow regarding the print ticket could be obtained, as shown in FIG. 15A.

FIG. 14B is a flow chart that shows an example embodiment of the operations performed by a document-store service (e.g., the document-store service 1010) when it receives a scanned document. The document-store service 1010 receives a SAML token and a scanned document from an MFD 103 in operation 1407. In operation 1408, the document-store service 1010 stores the scanned document in a database. The document-store service 1010 also checks whether recommendation information should be returned in operation 1409. When it is determined that the recommendation information should not be returned (operation 1409=No), then the process is terminated. When it is determined that the recommendation information should be returned (operation 1409=Yes), then the document-store service 1010 sends a user ID extracted from the received SAML token and a document ID generated by itself to the analyzed-data-storing service 1011 in operation 1410. In operation 1411, the document-store service 1010 gets recommendation information from the analyzed-data-storing service 1011. In operation 1412, the recommendation information is sent to the MFD 103.

Figure 15B:
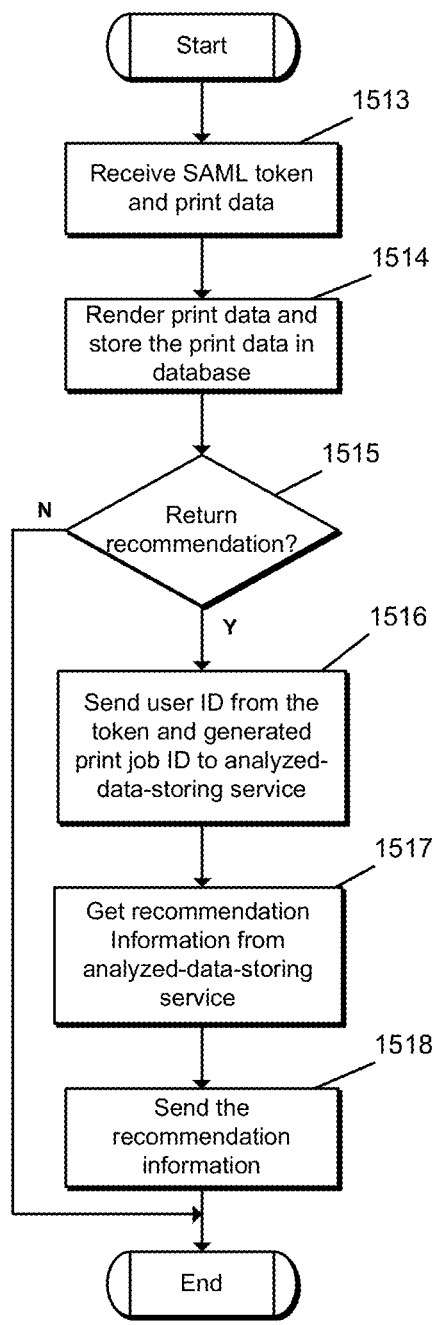
FIG. 15B is a flow chart that illustrates an example embodiment of operations performed by a document-store service when it receives print data.

If the scanned document in FIG. 14B is replaced by a print data, a similar flow regarding the print data could be obtained, as shown in FIG. 15B.

Figure 16:
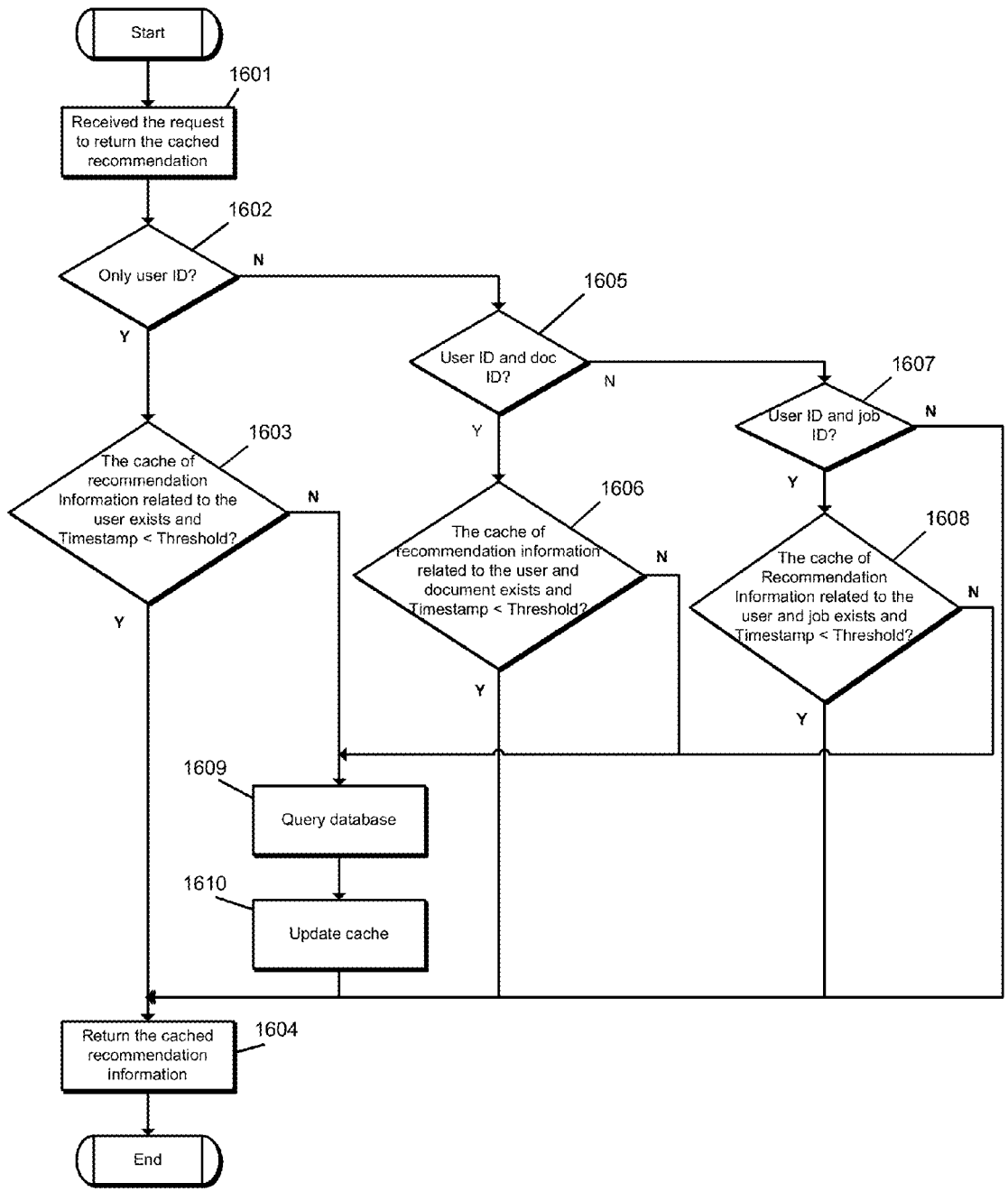
FIG. 16 is a flow chart that shows an example embodiment of a method that is controlled by an analyzed-data-storing service.

FIG. 16 is a flow chart that shows an example embodiment of a method that is controlled by an analyzed-data-storing service (e.g., the analyzed-data-storing service 1011). The flow starts when the analyzed-data-storing service 1011 is initiated. In operation 1601, the analyzed data storing service 1011 receives the request to return the cached recommendation information. Next, in operation 1602, if it is determined that the request includes only a user ID, the flow proceeds to operation 1603, where the analyzed-data-storing service 1011 checks whether the recommendation information related to the user exists in a cache. If it is determined that it exists in operation 1603, then the analyzed-data-storing service 1011 also checks whether a timestamp of the recommendation information is within the threshold (certain time, e.g., 60 seconds) in operation 1603.

If it is not within the threshold in operation 1603 or it is determined that the recommendation information related to the user does not exist in the cache in operation 1603, the flow proceeds to operation 1609, where the analyzed-data-storing service 1011 queries a database that is managed by the analyzed-data-storing service 1011. And the analyzed-data-storing service 1011 updates its own cache with the information obtained from the database in operation 1610. Then the analyzed-data-storing service 1011 returns the cached recommendation information in operation 1604.

If, in operation 1603, the timestamp is determined to be within the threshold and the recommendation information related to the user is determined to exist in the cache, then the flow proceeds to operation 1604. In operation 1604, the cached recommendation information is returned by the analyzed-data-storing service 1011.

If in operation 1602 it is not determined that the request includes only a user ID, the flow proceeds to operation 1605. In operation 1605, it is determined if the request includes both a user ID and a document ID. If yes, then the flow proceeds to operation 1606, where the analyzed-data-storing service 1011 checks whether the recommendation information related to the user and the document exists in a cache, and furthermore the analyzed-data-storing service 1011 also checks if a timestamp for the recommendation information related to the user and the document is within a threshold. If in operation 1606 the recommendation information related to the user and the document is determined to exist in the cache and if it is determined that the timestamp for the recommendation information related to the user and the document is within the threshold (operation 1606=Yes), then the flow proceeds to operation 1604 (described above).

Otherwise, if the request does not include a user ID or a document ID or the timestamp is not within the threshold (operation 1606=No), then the flow proceeds to operation 1609, where the analyzed-data-storing-service 1011 queries the database and then proceeds to update its own cache in operation 1610. Finally, the analyzed-data-storing service 1011 returns the cached recommendation information in operation 1604.

If in operation 1605 the user ID or the document ID is determined to not be included, then the flow proceeds to operation 1607, where it is determined if a user ID and a job ID are included in the request. If the request includes both a user ID and a print job ID in operation 1607, then the analyzed-data-storing service 1011 checks whether the recommendation information related to the user and the job ID exists in the cache in operation 1608. If the recommendation information related to the user and the job ID is determined to exist in the cache in operation 1608, then the analyzed-data-storing service 1011 also checks whether a timestamp for the recommendation information related to the user and the job ID is within a threshold.

If in operation 1608 it is determined that a timestamp for the recommendation information corresponding to the user and the job ID is not within the threshold or the recommendation information related to the user and the job ID does not exist in the cache, then the flow moves to operation 1609, where the analyzed-data-storing service 1011 queries the database managed by the analyzed-data-storing service 1011. Next, in operation 1610, the analyzed-data-storing service 1011 updates its own cache. Then the analyzed-data-storing service 1011 returns the cached recommendation information in operation 1604. However, if in operation 1608 it is determined that a timestamp for the recommendation information corresponding to the user and the job ID is within the threshold and the recommendation information related to the user and the print job does exist in the cache, then the flow proceeds to operation 1604.

Figure 17:
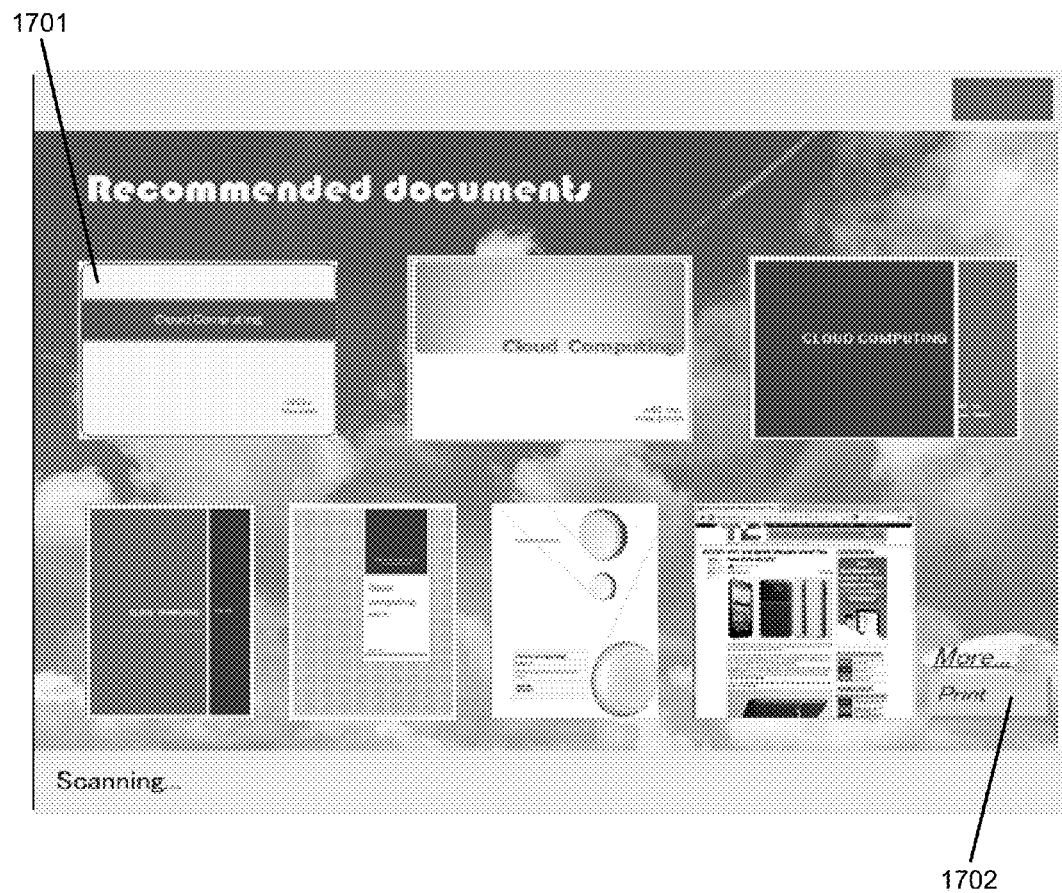
FIG. 17-FIG. 25 show example embodiments of user interfaces that may be shown on an operation panel.
Figure 18:
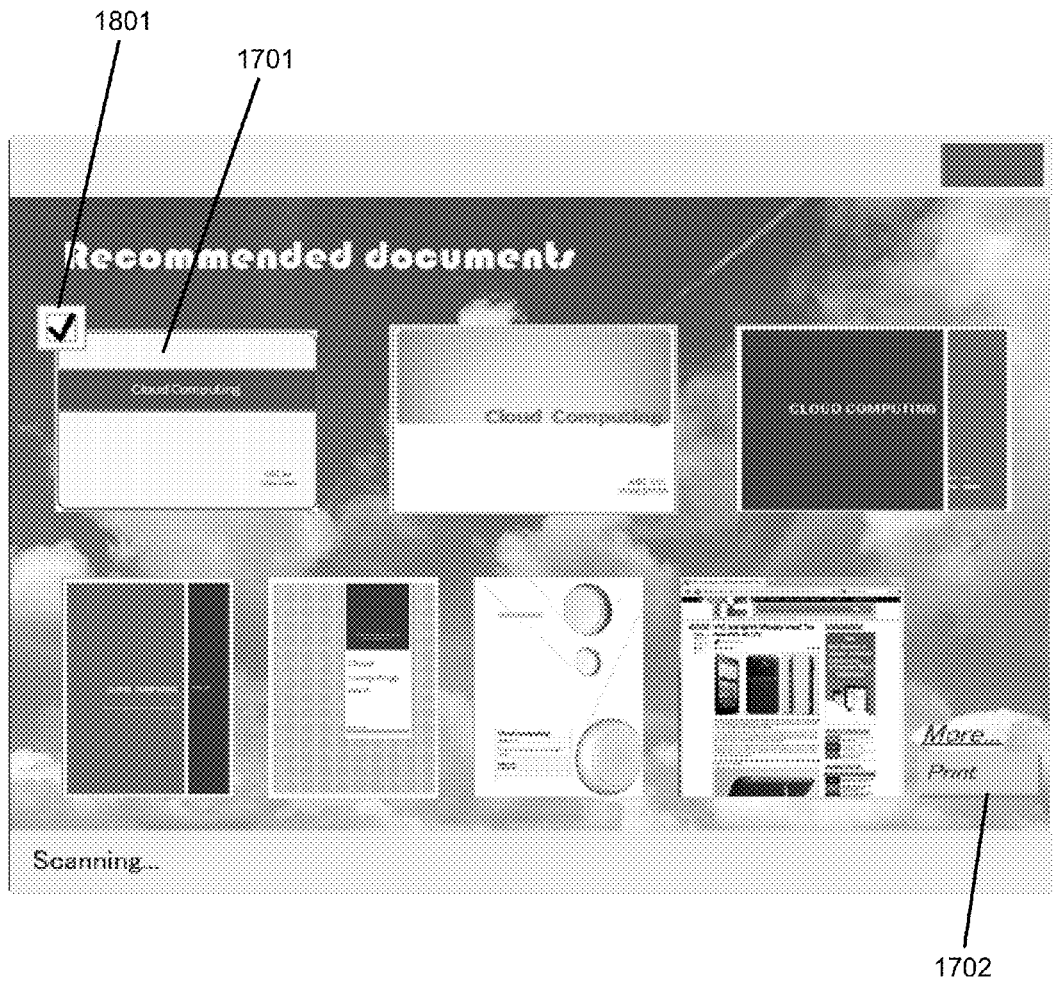

FIG. 17 and FIG. 18 are example embodiments of user interfaces that may be shown on an operation panel (e.g., the operation panel 407 in FIG. 4). The thumbnails of recommended documents may be shown in the operation panel 407. If one of the document thumbnails, for example thumbnail 1701, is selected via the operation panel, a check mark 1801 appears next to the selected thumbnail. And if the user activates a print button 1702, the selected document corresponding to the selected thumbnail 1701 is printed.

Figure 19:
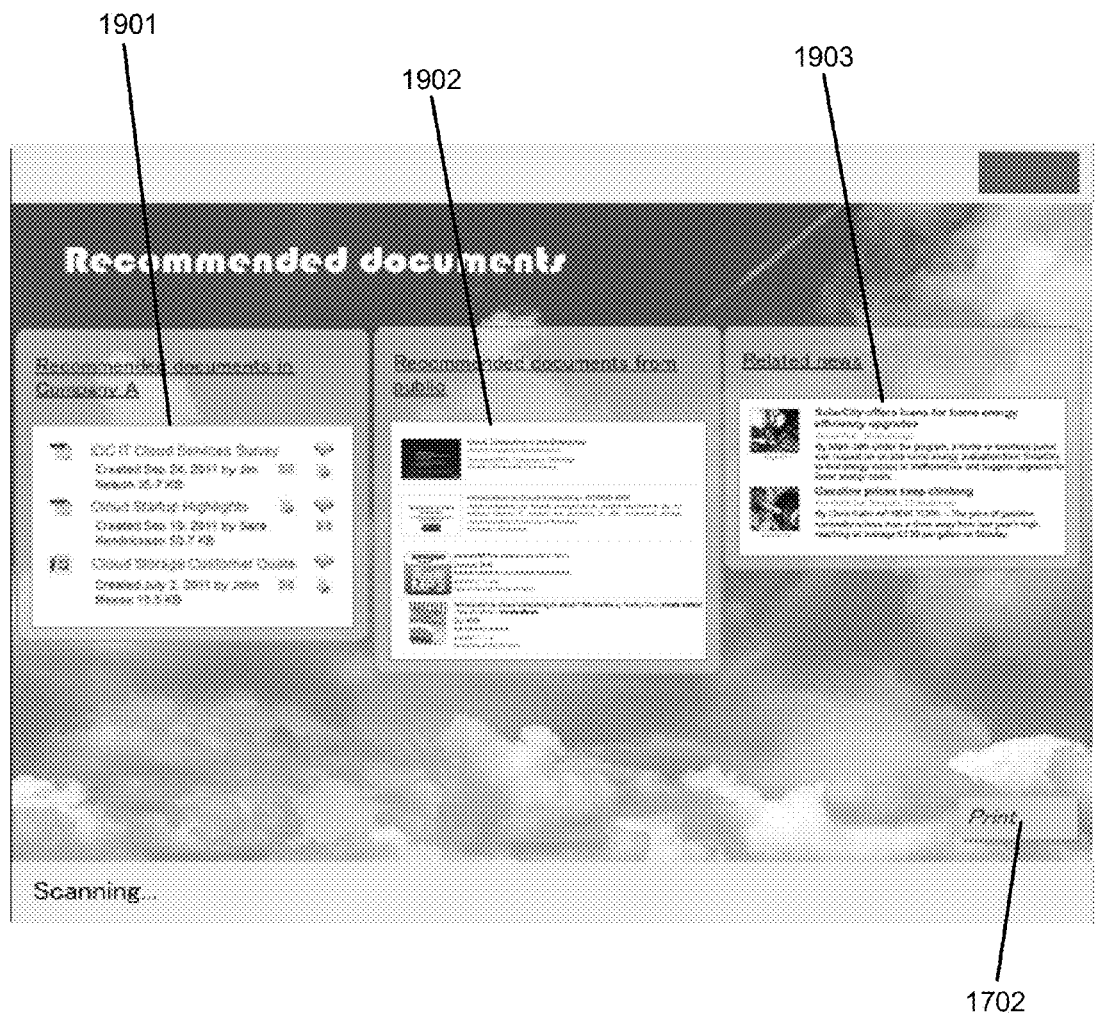
Figure 20:
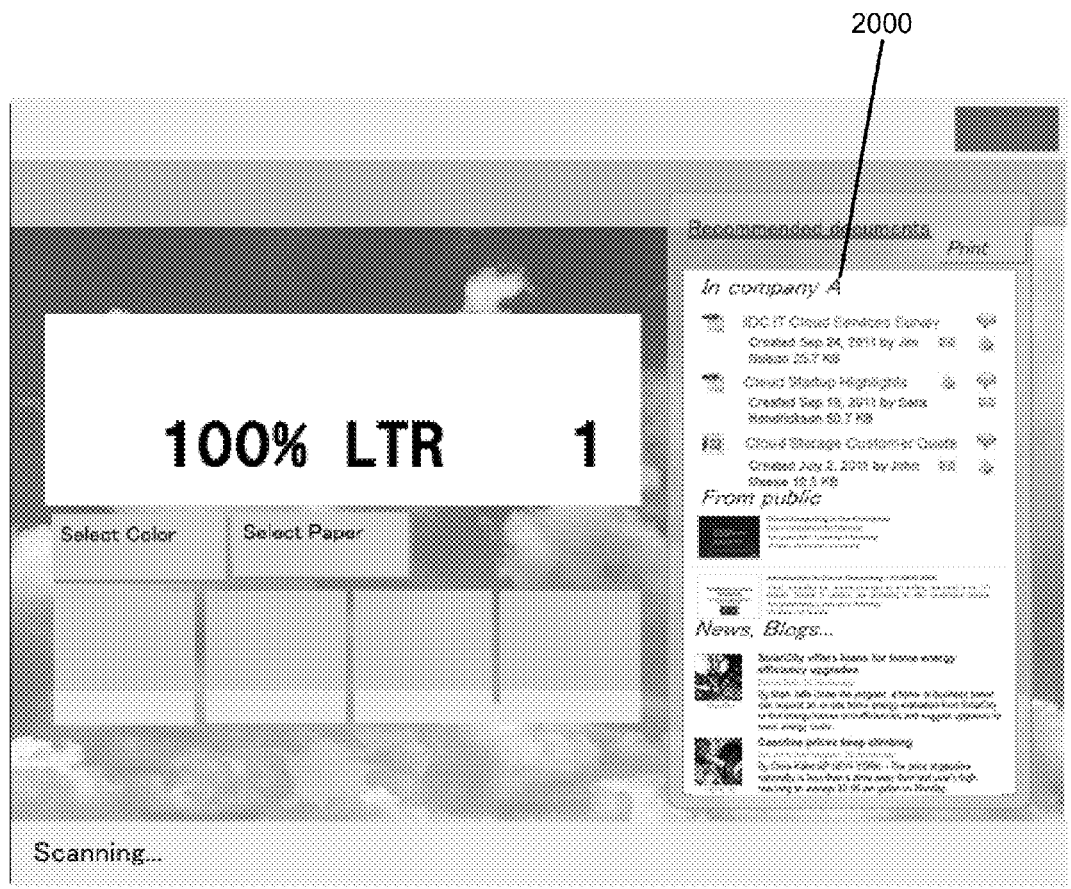

FIG. 19 and FIG. 20 are example embodiments of user interfaces that may be shown on an operation panel (e.g., the operation panel 407 in FIG. 4). As depicted in FIG. 19, a field 1901 shows recommended documents for a user in company A. A field 1902 shows recommended documents for the user that were obtained from public resources, for example from the Internet. A field 1903 shows recommended news for the user. As depicted in FIG. 20, the fields 1901, 1902, and 1903 may be merged as one field 2000. Operation buttons to operate MFD 103 may be displayed on the operation panel as well as the field 2000, as depicted in FIG. 20.

FIGS. 21-25 show example embodiments of user interfaces that may be shown on an operation panel (e.g., the operation panel 407 in FIG. 4). The user interfaces present thumbnails that represent recommended documents.

FIG. 26 shows an example embodiment of a data structure of a print job. The print job includes a public print-ticket portion 2601, a private print-ticket portion 2602, page 1 data 2603, and page 2 data 2604.

FIG. 27 shows an example embodiment of a data structure of a scan job. The scan job includes a public scan-ticket portion 2701, a private scan-ticket portion 2702, page 1 data 2703, and page 2 data 2704.

The above-described devices, systems, and methods can be implemented by supplying one or more computer-readable media that contain computer-executable instructions for realizing the above-described operations to one or more computing devices that are configured to read and execute the computer-executable instructions. Thus, the systems or devices perform the operations of the above-described embodiments when executing the computer-executable instructions. Also, an operating system on the one or more systems or devices may implement at least some of the operations of the above-described embodiments. Thus, the computer-executable instructions or the one or more computer-readable media that contain the computer-executable instructions constitute an embodiment.

Any applicable computer-readable medium (e.g., a magnetic disk (including a floppy disk, or a hard disk), an optical disc (including a CD, a DVD, or a Blu-ray disc), a magneto-optical disk, a magnetic tape, and semiconductor memory (including flash memory, DRAM, SRAM, a solid state drive, EPROM, or EEPROM)) can be employed as a computer-readable medium for the computer-executable instructions. The computer-executable instructions may be stored on a computer-readable storage medium that is provided on a function-extension board inserted into a device or on a function-extension unit connected to the device, and a CPU provided on the function-extension board or unit may implement at least some of the operations of the above-described embodiments.

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

The invention claimed is:

1. A method for generating a document recommendation, the method comprising:
obtaining document setting information for a first document;
generating a first document recommendation based on the document setting information for the first document, wherein the first document recommendation indicates a second document;
sending the first document recommendation to an image-forming device;
obtaining document content information for the first document;
generating a second document recommendation based on the document content information for the first document, wherein the second document recommendation indicates a third document; and
sending the second document recommendation to the image-forming device.

2. The method of claim 1, wherein sending the first document recommendation is performed before completion of the obtaining of the document content information.

3. The method of claim 1, further comprising:
obtaining user information that describes one or more attributes of a user;
generating a third document recommendation based on the user information; and
sending the third document recommendation to an image-forming device.

4. The method of claim 3, wherein generating the third document recommendation based on the user information includes determining another document that is associated with the user.

5. The method of claim 1, wherein generating the first document recommendation based on the document setting information includes extracting one or more document attributes from the document setting information and determining that the second document has identical or similar document attributes as the extracted one or more document attributes.

6. The method of claim 1, wherein generating the second document recommendation based on the document content information includes determining that the third document has identical or similar contents as contents in the document content information.

7. The method of claim 1, wherein the document setting information is a document ticket.

8. The method of claim 7, wherein the document ticket is a print ticket.

9. The method of claim 7, wherein the document ticket is a scan ticket.

10. A device for generating a document recommendation, the device comprising:
a communication interface;
one or more computer-readable media; and
one or more processors coupled to the one or more computer-readable media and configured to cause the device to perform operations including
obtaining document setting information for a first document;
sending a first request for a document recommendation to a recommendation service, wherein the first request includes the document setting information;
receiving a first document recommendation in response to the first request, wherein the first document recommendation indicates a second document;
obtaining at least some contents of the first document;
sending a second request for a document recommendation to the recommendation service, wherein the second request includes the at least some of the contents of the first document; and receiving a second document recommendation in response to the second request, wherein the second document recommendation indicates a third document.

11. The device of claim 10, wherein the device is a multi-function device.

12. The device of claim 10, wherein the recommendation service operates in a computing cloud.

13. The device of claim 10, wherein the document setting information is a public print ticket, a public scan ticket, a private print ticket, or a private scan ticket.

14. The device of claim 10, wherein the at least some of the contents of the document are obtained by pulling the document from a print server.

15. The device of claim 10, wherein the at least some of the contents of the document are obtained from a scanner of the device.

16. The device of claim 10, wherein the operations further include
    setting the first document recommendation to level 1, wherein level 1 indicates an initial recommendation; and
    setting the second document recommendation to level 2, wherein level 2 indicates a revised recommendation.

17. One or more non-transitory computer-readable media storing instructions that, when executed by one or more computing devices, cause the computing devices to perform operations comprising:

obtaining document setting information for a first document;

generating first document recommendations based on the document setting information, wherein the first document recommendations include a first list of one or more recommended documents;

sending the first document recommendations to a requesting device;

obtaining a page of document data;

generating second document recommendations based on the page of document data, wherein the second document recommendations include a second list of one or more recommended documents; and sending the second document recommendations to the requesting device.

18. The one or more non-transitory computer-readable media claim 15,
    wherein sending the first document recommendations is performed before completion of the obtaining of the page of document data.

19. The method of claim 1, wherein the document setting information for the first document is obtained from an image forming device, and wherein the document content information for the first document is obtained from the image forming device.

* * * * *